(12) United States Patent
Okayama

(10) Patent No.: US 11,977,800 B2
(45) Date of Patent: May 7, 2024

(54) SERVER APPARATUS THAT CONTROLS PRINT JOB AND PROVIDES STATUS INFORMATION ON THE PRINT JOB, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Noritsugu Okayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/165,031

(22) Filed: Feb. 6, 2023

(65) Prior Publication Data
US 2023/0251807 A1    Aug. 10, 2023

(30) Foreign Application Priority Data
Feb. 7, 2022    (JP) ................. 2022-017125

(51) Int. Cl.
*G06F 3/12*    (2006.01)
(52) U.S. Cl.
CPC .......... *G06F 3/1259* (2013.01); *G06F 3/1203* (2013.01); *G06F 3/1287* (2013.01)
(58) Field of Classification Search
None
See application file for complete search history.

(56) References Cited

U.S. PATENT DOCUMENTS

2007/0245354 A1    10/2007 Tomita
2009/0290190 A1*   11/2009 Torii ..................... G06F 3/1273
                                                                358/1.15
(Continued)

FOREIGN PATENT DOCUMENTS

JP    2021064919 A      4/2021
JP    2021192149 A  *  12/2021
(Continued)

OTHER PUBLICATIONS

Extended European Search Report issued in European Appln. No. 23154622.7 dated Jun. 15, 2023.

*Primary Examiner* — Henok Shiferaw
(74) *Attorney, Agent, or Firm* — ROSSI, KIMMS & McDOWELL LLP

(57) ABSTRACT

A server apparatus that is capable of notifying a user of an execution situation of a print job input to an image forming apparatus from an external apparatus. The server apparatus notifies an application of a communication terminal of information about a print job executed by an image forming apparatus. The server apparatus includes an obtainment unit that obtains status information about a print job that is input to the image forming apparatus from an external apparatus, and a controller that displays a message based on the status information on a display unit of the communication terminal. The controller displays a message, which shows that a predetermined print job cannot be executed because another print job is under execution, in a case where the predetermined print job is input to the image forming apparatus and the image forming apparatus is executing the other print job.

16 Claims, 21 Drawing Sheets

(56) References Cited

U.S. PATENT DOCUMENTS

| | | | |
|---|---|---|---|
| 2013/0077129 A1* | 3/2013 | Soh | H04N 1/00244 358/1.15 |
| 2015/0070719 A1* | 3/2015 | Kuribara | G06F 3/1292 358/1.15 |
| 2015/0156348 A1* | 6/2015 | Kittaka | G06F 3/1234 358/1.14 |
| 2015/0317104 A1* | 11/2015 | Takenouchi | G06F 3/1238 358/1.15 |
| 2016/0019013 A1* | 1/2016 | Ido | G06F 3/1286 358/1.15 |
| 2017/0257526 A1* | 9/2017 | Nakamura | H04N 1/00344 |
| 2019/0310809 A1* | 10/2019 | Sekine | G06F 3/1235 |
| 2019/0369924 A1* | 12/2019 | Oka | H04L 51/02 |
| 2020/0133592 A1* | 4/2020 | Mitsuhashi | H04L 51/02 |
| 2020/0310707 A1* | 10/2020 | Sone | G06F 8/65 |
| 2021/0120144 A1 | 4/2021 | Takahashi | |

FOREIGN PATENT DOCUMENTS

| | | |
|---|---|---|
| JP | 2021192149 A | 12/2021 |
| KR | 100833236 B1 | 5/2008 |
| KR | 101758676 B1 | 7/2017 |

\* cited by examiner

FIG. 10

| Variation Time (1001) | User ID (1002) | Image Forming Apparatus ID (1003) | Job ID (1004) | File Name (1005) | Job Type (1006) | Job State (1007) | Job Acceptance Time (1008) | Print Start Time (1009) | Print Finish Time (1010) |
|---|---|---|---|---|---|---|---|---|---|
| 2021/11/11 1:10 | USER B | MFP B | 0011 | APPLICATION FORM B | NORMAL PRINT | CANCEL | 2021/11/11 1:05 | | |
| 2021/11/11 1:11 | USER A | MFP A | 0003 | BILL A | HOLD PRINT | STANDBY | 2021/11/11 1:11 | | |
| 2021/11/11 1:12 | USER A | MFP A | 0003 | BILL A | HOLD PRINT | WAITING FOR START OF PRINT | 2021/11/11 1:11 | | |
| 2021/11/11 1:13 | USER A | MFP A | 0003 | BILL A | HOLD PRINT | PRINTING | 2021/11/11 1:11 | 2021/11/11 1:13 | |
| 2021/11/11 1:15 | USER B | MFP A | 0004 | b.jpg | HOLD PRINT | STANDBY | 2021/11/11 1:15 | | |
| 2021/11/11 1:19 | USER B | MFP A | 0003 | BILL A | HOLD PRINT | PRINT FINISH | 2021/11/11 1:11 | 2021/11/11 1:13 | 2021/11/11 1:19 |
| 2021/11/11 1:20 | USER B | MFP A | 0004 | b.jpg | HOLD PRINT | PRINTING | 2021/11/11 1:15 | 2021/11/11 1:20 | |
| 2021/11/11 1:23 | USER B | MFP A | 0004 | b.jpg | HOLD PRINT | PRINT FINISH | 2021/11/11 1:15 | 2021/11/11 1:20 | 2021/11/11 1:23 |
| 2021/11/11 1:25 | USER C | MFP B | 0012 | memo.txt | NORMAL PRINT | PRINTING | 2021/11/11 1:25 | 2021/11/11 1:25 | |

| CHART MANAGEMENT ID | REGISTRATION TIME | USER ID | IMAGE FORMING APPARATUS ID | JOB ID | JOB TYPE | GIVEN MESSAGE ID | RECEIVED BUTTON | CHAT SITUATION |
|---|---|---|---|---|---|---|---|---|
| 1 | 2021/11/11 1:12 | USER B | MFP B | 0003 | HOLD PRINT | | PRINT EXECUTION BUTTON | |
| 2 | 2021/11/11 1:13 | USER A | MFP A | 0004 | HOLD PRINT | 2,5 | JOB CANCEL BUTTON | FINISHED |
| 3 | 2021/11/11 1:15 | USER A | MFP A | 0005 | HOLD PRINT | 6 | PRINT EXECUTION BUTTON | |
| 4 | 2021/11/11 1:19 | USER A | MFP A | 0006 | HOLD PRINT | 4 | NOTIFICATION OFF BUTTON | |
| 5 | 2021/11/11 1:20 | USER B | MFP A | 0003 | NORMAL PRINT | 1 | | |
| | | | | | | 2 | | |

FIG. 12

| MESSAGE ID | MESSAGE FORMAT | REPLY BUTTON INFORMATION | |
|---|---|---|---|
| | | HOLD PRINT | NORMAL PRINT |
| 1 | #[JOB TYPE](Job ID:#[JOB ID]Document name:#[FILE NAME]) is accepted. Print cannot be executed for some time because another user is printing currently. | JOB CANCEL BUTTON, PRINT EXECUTION BUTTON, NOTIFICATION OFF BUTTON | JOB CANCEL BUTTON, NOTIFICATION OFF BUTTON |
| 2 | #[JOB TYPE](Job ID:#[JOB ID]Document name:#[FILE NAME]) is accepted. Print can be executed currently. | JOB CANCEL BUTTON, PRINT EXECUTION BUTTON, NOTIFICATION OFF BUTTON | JOB CANCEL BUTTON, NOTIFICATION OFF BUTTON |
| 3 | Job ID:#[JOB ID],Document name:#[FILE NAME] waits for start of print. | JOB CANCEL BUTTON, NOTIFICATION OFF BUTTON | JOB CANCEL BUTTON, NOTIFICATION OFF BUTTON |
| 4 | Job ID:#[JOB ID],Document name:#[FILE NAME] is under printing. | JOB CANCEL BUTTON, NOTIFICATION OFF BUTTON | JOB CANCEL BUTTON, NOTIFICATION OFF BUTTON |
| 5 | Job ID:#[JOB ID],Document name:#[FILE NAME] is cancelled. | --- | --- |
| 6 | Job ID:#[JOB ID],Document name:#[FILE NAME] has been printed. | --- | --- |

1201 1202 1203 1204 1205

SERVER APPARATUS THAT CONTROLS PRINT JOB AND PROVIDES STATUS INFORMATION ON THE PRINT JOB, CONTROL METHOD THEREFOR, AND STORAGE MEDIUM STORING CONTROL PROGRAM THEREFOR

BACKGROUND OF THE INVENTION

Field of the Invention

The present invention relates to a server apparatus, a control method therefor, and a storage medium storing a control program therefor.

Description of the Related Art

There is a known image forming apparatus that executes a print job. A user can check an execution situation of a print job, such as standby or executing, through an operation panel of the image forming apparatus. Moreover, some image forming apparatuses have a function that is called hold print that starts a print process of the above-mentioned print job in response to a print instruction from a user who inputs the print job concerned without immediately executing the print job input from an external apparatus.

Moreover, a system in which a server apparatus notifies a communication terminal equipped with a chat application of FAX information received by an image forming apparatus in real-time by a dialogic operation is proposed (for example, see Japanese Laid-Open Patent Publication (Kokai) No. 2021-64919 (JP 2021-64919A)). Thereby, even if the user is apart from the image forming apparatus, they can check the FAX information that is received by the image forming apparatus using the communication terminal.

However, the technique of the above-mentioned publication does not notify the communication terminal of an execution situation of the print job input to the image forming apparatus from the external apparatus. Accordingly, the user who inputs the print job cannot recognize the execution situation of the print job unless moving to a front of the image forming apparatus, which is inconvenient. For example, when checking a display panel of the image forming apparatus, the user can find that their input print job is not executed because another print job input by another user is executing.

SUMMARY OF THE INVENTION

The present invention provides a server apparatus, a control method therefor, and a control program therefor, which are capable of notifying a user of an execution situation of a print job input to an image forming apparatus from an external apparatus even if the user is apart from the image forming apparatus.

Accordingly, an aspect of the present invention provides a server apparatus that notifies an application of a communication terminal of information about a print job executed by an image forming apparatus, the server apparatus including an obtainment unit configured to obtain status information about a print job that is input to the image forming apparatus from an external apparatus, and a controller configured to display a message based on the status information on a display unit of the communication terminal, wherein the controller displays a message, which shows that a predetermined print job cannot be executed because another print job different from the predetermined print job is under execution, in a case where the predetermined print job is input to the image forming apparatus from the external apparatus and the image forming apparatus is executing the other print job.

According to the present invention, a user can be notified of an execution situation of a print job input to an image forming apparatus from an external apparatus even if the user is apart from the image forming apparatus.

Further features of the present invention will become apparent from the following description of exemplary embodiments with reference to the attached drawings.

BRIEF DESCRIPTION OF THE DRAWINGS

FIG. 10 is a view showing an example of a management table managed by the chat server in FIG. 1.

FIG. 11 is a view showing an example of a chat information management table managed by the chat server in FIG. 1.

FIG. 12 is a view showing examples of message templates used for generating chat message data in a step S915 in FIG. 9.

DESCRIPTION OF THE EMBODIMENTS

Figure 1:
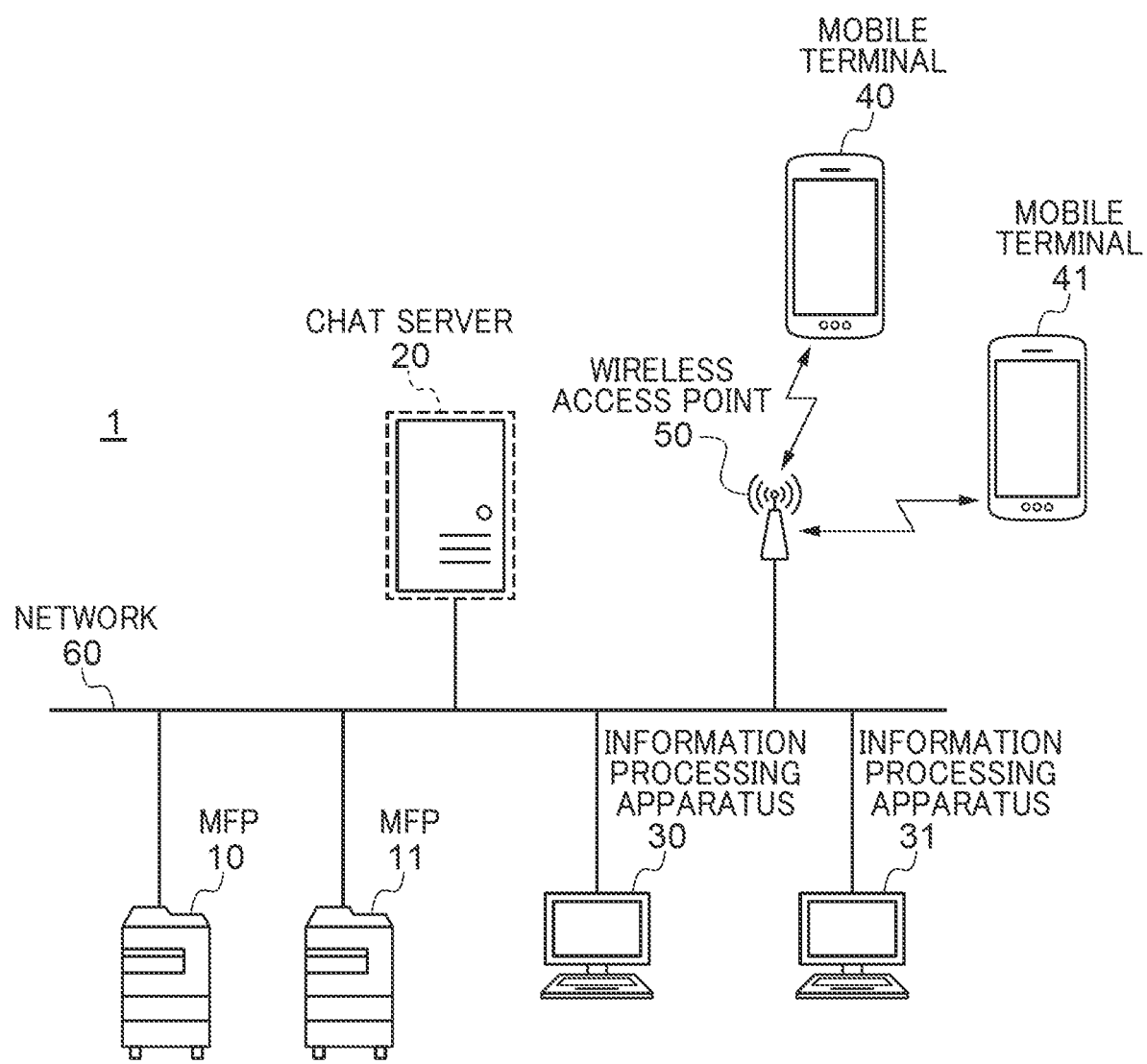
FIG. 1 is a network diagram schematically showing a configuration of an image forming system including a server apparatus according to an embodiment.

Hereafter, embodiments according to the present invention will be described in detail by referring to the drawings.

FIG. 1 is a network diagram schematically showing a configuration of an image forming system 1 including a server apparatus according to an embodiment. As shown in FIG. 1, the image forming system 1 consists of an MFP 10, an MFP 11, a chat server 20 as the server apparatus, an information processing apparatus 30, an information processing apparatus 31, a mobile terminal 40, a mobile terminal 41, and a wireless access point 50. These are mutually connected through a network 60 and are communicable. Additionally, an MFP is an abbreviated name for a Multi-Function Peripheral.

The MFPs 10 and 11 are image forming apparatuses having a function that prints print jobs received from the information processing apparatuses 30 and 31, and the mobile terminals 40 and 41. Although the configuration in which the two MFPs are connected to the network 60 is described as an example in the embodiment, this configuration is not indispensable. For example, a configuration in which a single MFP is connected to the network 60 or a configuration in which three or more MFPs are connected to the network 60 may be employed.

The chat server 20 is a server that provides chat service between a mobile terminal and an MFP as a chatbot. For example, the chat server 20 receives information about a print job from the MFP 10 via the network 60 and notifies a chat application 701 in FIG. 7 mentioned later that runs on the mobile terminal 40 or the mobile terminal 41 of an execution situation of the print job. Moreover, the chat server 20 receives chat information from the chat application 701 mentioned later and transmits an instruction about the print job to the MFP 10 or the MFP 11 on the basis of the chat information.

The information processing apparatuses 30 and 31 are external apparatuses, such as personal computers. A user can transmit document data that is a print target as a print job to the MFP 10 or the MFP 11 by using the information processing apparatus 30 or 31. Additionally, although the configuration in which the two information processing apparatuses are connected to the network 60 is described as an example in the embodiment, this configuration is not indispensable. For example, a configuration in which a single information processing apparatus is connected to the network 60 or a configuration in which three or more information processing apparatuses are connected to the network 60 may be employed.

The mobile terminals 40 and 41 are communication terminals, such as smart phones or tablet terminals. Additionally, although the mobile terminals 40 and 41 are described as apparatuses, such as smart phones or tablet PCs, in the embodiment, the mobile terminals 40 and 41 are not limited to such apparatuses. The mobile terminals 40 and 41 may be apparatuses of a type other than a smart phone and tablet PC as long as the apparatuses are connectable to the network.

The mobile terminals 40 and 41 are connected to the network 60 via the wireless access point 50 and can communicate with the chat server 20. Additionally, although the configuration in which the two mobile terminals are connected to the wireless access point 50 is described as an example in the embodiment, this configuration is not indispensable. For example, a configuration in which a single mobile terminal is connected to the network 60 or a configuration in which three or more mobile terminals are connected to the network 60 may be employed. A user can check an execution situation of a print job in the MFP 10 or the MFP 11 and can give an instruction to the print job concerned by the chat application 701 mentioned later in FIG. 7 that runs on the mobile terminal 40 or the mobile terminal 41. The wireless access point 50 is a wireless apparatus that wirelessly connected to the mobile terminal 40 or the mobile terminal 41 so as to connect the mobile terminals 40 and 41 to the network 60.

Next, hardware configurations of the MFP 10 and MFP 11 will be described. Additionally, since the MFP 10 and MFP 11 have similar hardware configurations in the embodiment, the hardware configuration of the MFP 10 will be described hereinafter as an example.

Figure 2:
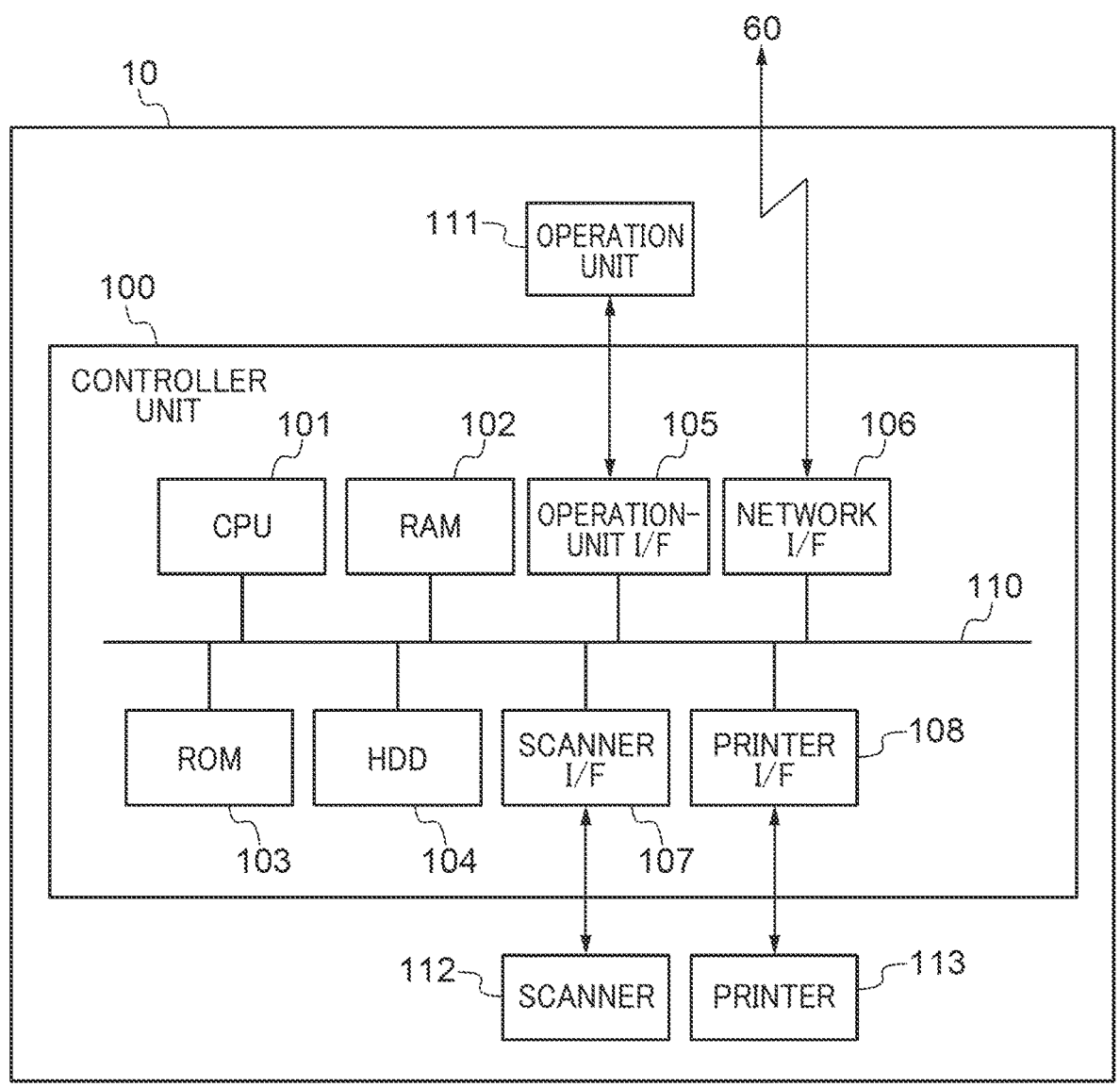
FIG. 2 is a block diagram schematically showing a hardware configuration of an MFP in FIG. 1.

FIG. 2 is a block diagram schematically showing a hardware configuration of the MFP 10 in FIG. 1. As shown in FIG. 2, the MFP 10 is provided with a controller unit 100, an operation unit 111, a scanner 112, and a printer 113. The controller unit 100 is connected to the operation unit 111, scanner 112, and printer 113.

The controller unit 100 is provided with a CPU 101, a RAM 102, a ROM 103, an HDD 104, an operation-unit I/F 105, a network I/F 106, a scanner I/F 107, and a printer I/F 108. These units are mutually connected via a system bus 110.

The CPU 101 boots the MFP 10 on the basis of a boot program stored in the ROM 103. Moreover, the CPU 101 reads a control program stored in the HDD 104 and executes a predetermined process with using the RAM 102 as a work area. The HDD 104 stores the control program that achieves functions of the MFP 10, such as a copy function and a print function. The operation-unit I/F 105 controls data input/output communication with the operation unit 111. The network I/F 106 is connected to the network 60 and controls input and output of information via the network 60. The scanner I/F 107 obtains image data from the scanner 112 and inputs and outputs scanner control data. The printer I/F 108 outputs output image data to the printer 113 and inputs and outputs printer control data.

The operation unit 111 is an interface that receives an instruction from a user and displays various kinds of information. The operation unit 111 is provided with input devices, such as a touch panel and hard keys, and display devices, such as an LCD and an LED. The scanner 112 is provided with an optical reading device like a CCD and has a function that scans a paper medium optically and reads as electronic image data. The printer 113 has a function that forms electronic image data as an image on a recording medium like a sheet.

The MFP 10 has a print function that prints a print job received from the information processing apparatus 30 or the information processing apparatus 31 via the network I/F 106 with the printer 113. Moreover, the MFP 10 has a hold print function that temporarily stores a received print job in the HDD 104 and prints it with the printer 113 in response to a user's print instruction from the operation unit 111 or an external apparatus. Furthermore, when executing a process about a print job, the MFP 10 stores status information about the print job concerned in the HDD 104. The status information about the print job stored in the HDD 104 is transmitted to the external apparatuses, such as the information processing apparatus 30, the information processing apparatus 31, the mobile terminal 40, and the mobile terminal 41, via the network I/F 106.

Figure 3:
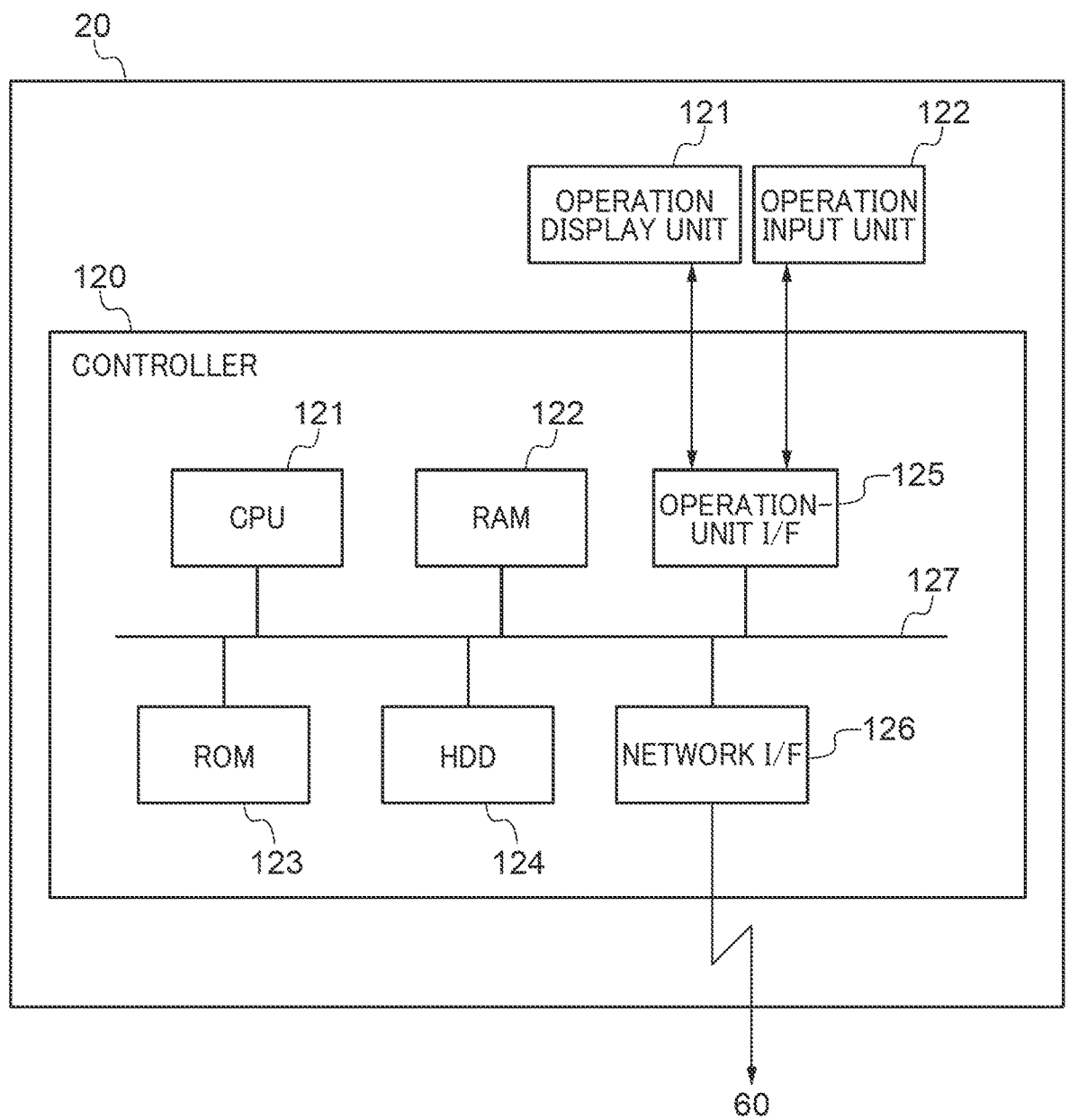
FIG. 3 is a block diagram schematically showing a hardware configuration of a chat server in FIG. 1.

FIG. 3 is a block diagram schematically showing a hardware configuration of the chat server 20 in FIG. 1. The chat server 20 is provided with a controller 120, an operation display unit 128, and an operation input unit 129. The controller 120 is connected to the operation display unit 128 and the operation input unit 129. The controller 120 is provided with a CPU 121, a RAM 122, a ROM 123, an HDD 124, an operation-unit I/F 125, and a network I/F 126. These units are mutually connected via a system bus 127.

The CPU 121 runs various control programs to control operations of the entire chat server 20. The various control programs are stored in the ROM 123. For example, a chatbot program 601 in FIG. 6 mentioned later that provides chat service to the mobile terminal 40 or the mobile terminal 41 is stored in the ROM 123. The CPU 121 reads a control program stored in the ROM 123 or the HDD 124 and executes a predetermined process with using the RAM 122 as a work area. The network I/F 126 controls input and output of information via the network 60. The operation-unit I/F 125 controls data output communication to the operation display unit 128 and data input communication from the operation input unit 129. The operation display unit 128 is a display interface to a user and is provided with display devices, such as an LCD and an LED. The operation input unit 129 is an interface to input an instruction from a user and is provided with input devices, such as a keyboard and a mouse.

Next, the hardware configurations of the mobile terminal 40 and the mobile terminal 41 will be described. Additionally, since the mobile terminal 40 and mobile terminal 41 have similar hardware configurations in the embodiment, the hardware configuration of the mobile terminal 40 will be described hereinafter as an example.

Figure 4:
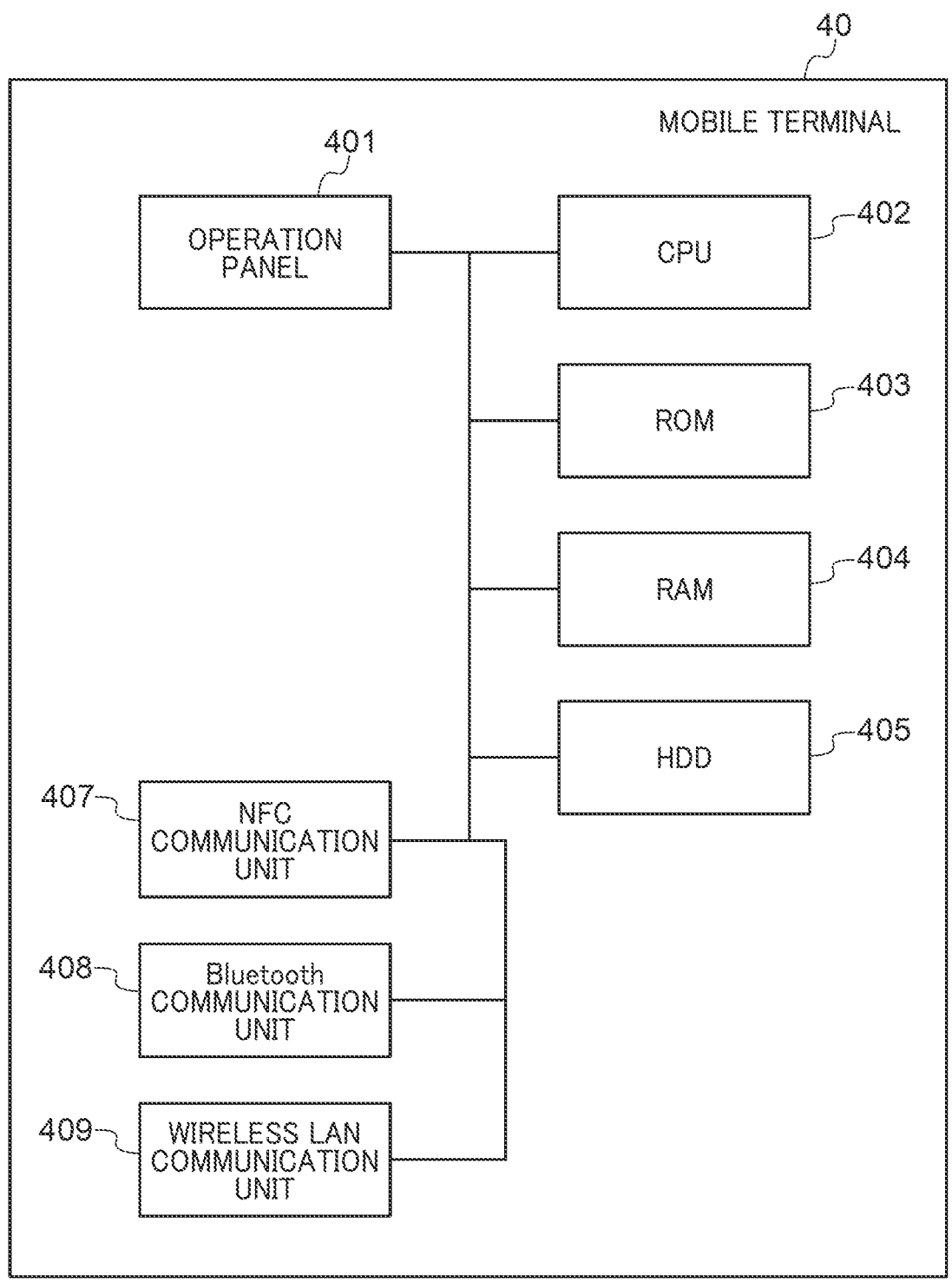
FIG. 4 is a block diagram schematically showing a hardware configuration of a mobile terminal in FIG. 1.

FIG. 4 is a block diagram schematically showing the hardware configuration of the mobile terminal 40 in FIG. 1. As shown in FIG. 4, the mobile terminal 40 is provided with an operation panel 401, a CPU 402, a ROM 403, a RAM 404, an HDD 405, an NFC communication unit 407, a Bluetooth communication unit 408, and a wireless LAN communication unit 409. These units are connected mutually.

The CPU 402 reads a control program stored in the ROM 403 and various kinds of information stored in the HDD 405 to the RAM 40 and executes various processes to control operations of the mobile terminal 40. The ROM 403 stores the control program. For example, the ROM 403 stores the control program that operates a chat application 701 in FIG. 7 mentioned later. The RAM 404 is used as a main memory of the CPU 402 and a temporary storage area like a work area of the CPU 402. The HDD 405 stores various data, such as photos and digital documents.

The operation panel 401 is provided with a touch panel function that can detect a user's touch operation and functions as a display unit that displays various screens provided by the OS and the chat application. A user can input a desired operation instruction to the mobile terminal 40 by touching the operation panel 401. The mobile terminal 40 interchanges data with various peripheral devices via the NFC communication unit 407, Bluetooth communication unit 408, and wireless LAN communication unit 409. Communication with the wireless access point 50 is also performed via the wireless LAN communication unit 409.

Next, software configurations of the MFP 10 and MFP 11 will be described. Additionally, since the MFP 10 and MFP 11 have similar software configurations in the embodiment, the software configuration of the MFP 10 will be described hereinafter as an example.

Figure 5:
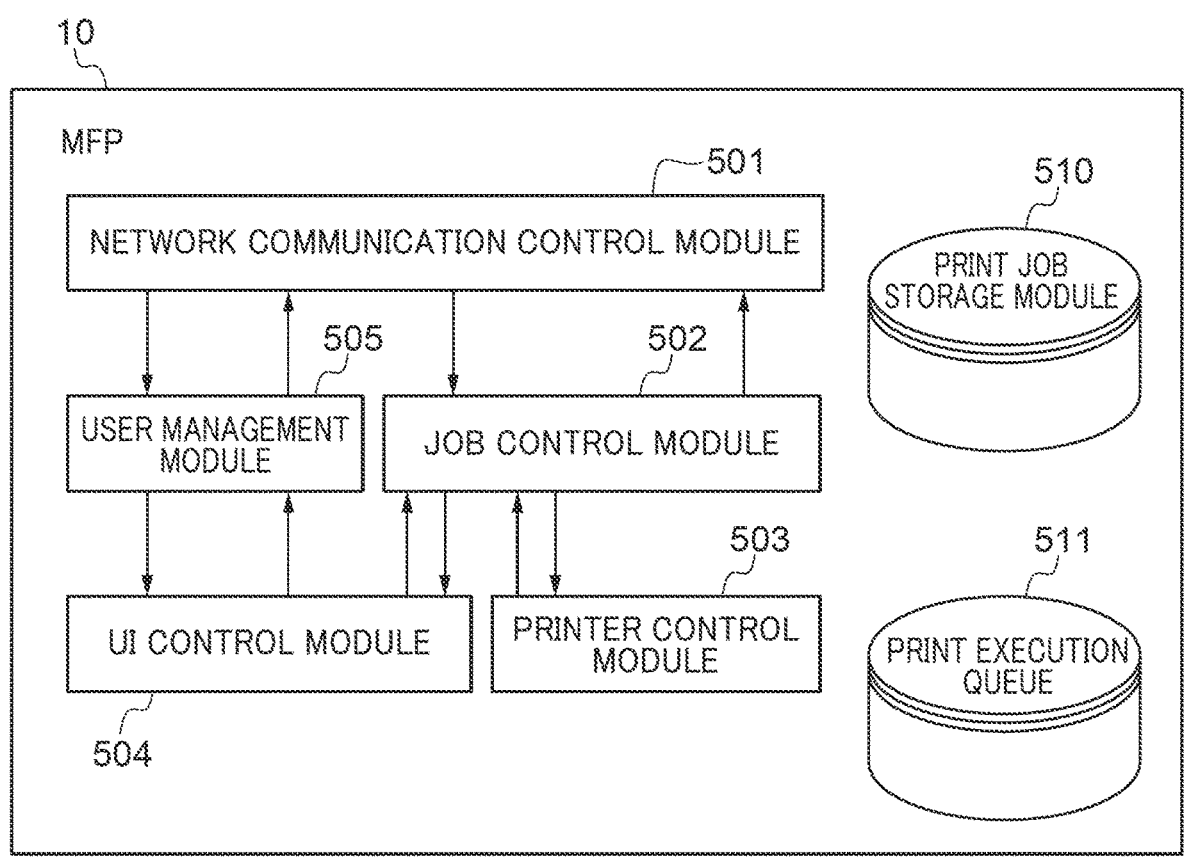
FIG. 5 is a block diagram schematically showing a software configuration of the MFP in FIG. 1.

FIG. 5 is a block diagram schematically showing the software configuration of the MFP 10 in FIG. 1. As shown in FIG. 5, the MFP 10 is provided with a network communication control module 501, a job control module 502, and a printer control module 503 as software modules. The MFP 10 is further provided with a UI control module 504, a user management module 505, a print job storage module 510, and a print execution queue 511. Processes by the above-mentioned modules are achieved by executing programs stored in the ROM 203 etc. by the CPU 101 of the MFP 10.

The network communication control module 501 controls input and output of data with an external apparatus via the network I/F 106. For example, the network communication control module 501 controls communications of a print job and information about the print job. The job control module 502 controls the print job and manages the status of the print job. The printer control module 503 controls the printer I/F 108 so as to execute a print process with the printer 113. The UI control module 504 controls display of a screen by the operation unit 111 and processes a user's operation that is received by the operation unit 111. The user management module 505 manages user information about a user who uses the MFP 10. The print job storage module 510 performs a process that saves the print job that the MFP 10 receives. The print execution queue 511 records the print job that the printer control module 503 processes. In the MFP 10, the print process is sequentially executed from the print job previously recorded on the print execution queue.

Figure 6:
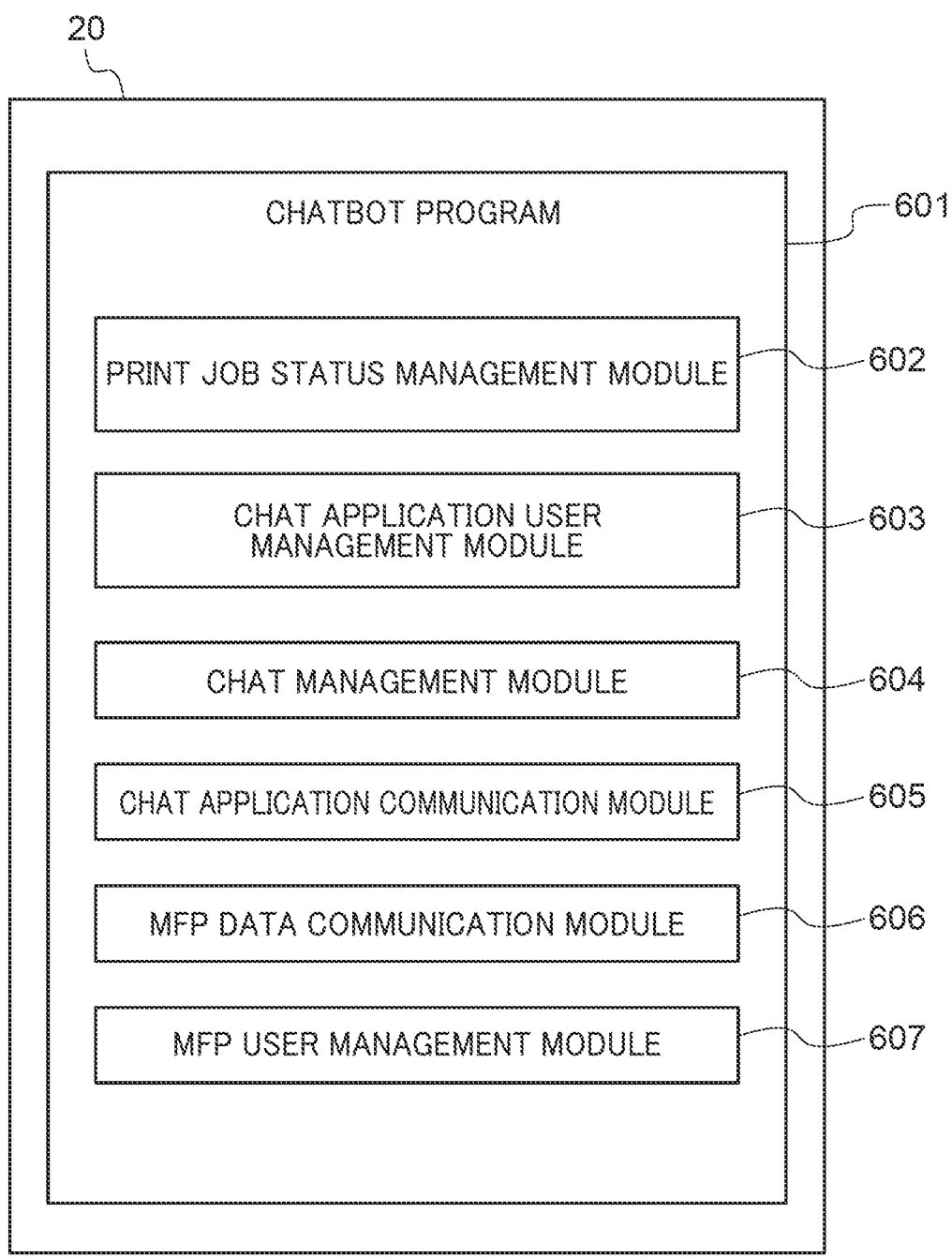
FIG. 6 is a block diagram schematically showing a configuration of a chatbot program that runs on the chat server in FIG. 1.

FIG. 6 is a block diagram schematically showing a configuration of the chatbot program 601 that runs on the chat server 20 in FIG. 1. As shown in FIG. 6, the chatbot program 601 includes a print job status management module 602, a chat application user management module 603, and a chat management module 604. The chatbot program 601 further includes a chat application communication module 605, an MFP data communication module 606, and an MFP user management module 607.

The print job status management module 602 manages a print job status (status information) mentioned later that is received from the MFP 10 or the MFP 11. The chat application user management module 603 manages information (hereinafter referred to as "user information") about a user who uses a chat application 701 in FIG. 7 mentioned later. The chat management module 604 controls a dialog with the chat application 701 on the basis of the print job status and user information. The chat application communication module 605 controls the communication with the chat application 701 and interchanges a message with the chat application 701. The MFP data communication module 606 controls communications with the MFP 10 and MFP 11. The MFP user management module 607 manages the user information about a user who is allowed to login to the MFP 10 or the MFP 11.

Next, software configurations of the mobile terminal 40 and mobile terminal 41 will be described. Additionally, since the mobile terminal 40 and mobile terminal 41 have similar software configurations in the embodiment, the software configuration of the mobile terminal 40 will be described hereinafter as an example.

Figure 7:
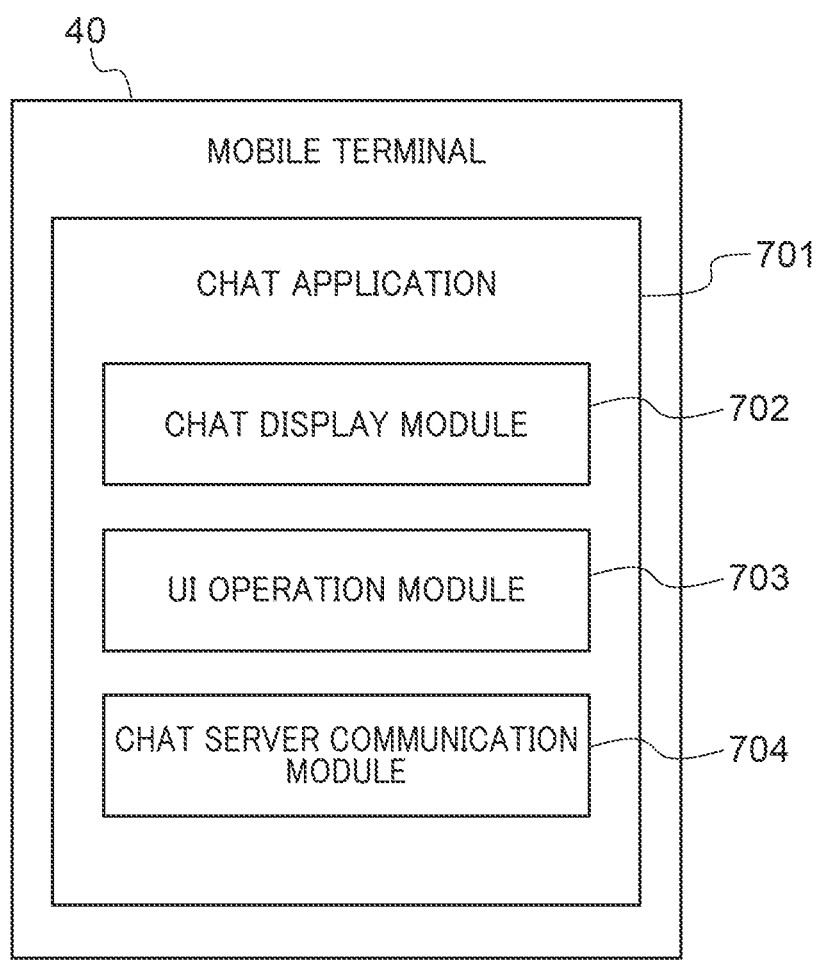
FIG. 7 is a block diagram schematically showing a configuration of a chat application that runs on the mobile terminal in FIG. 1.

FIG. 7 is a block diagram schematically showing a configuration of the chat application 701 that runs on the mobile terminal 40 in FIG. 1. As shown in FIG. 7, the chat application 701 consists of a chat display module 702, an UI operation module 703, and a chat server communication module 704. The process by these modules is achieved by executing a program stored in the ROM 403 etc. by the CPU 402 of the mobile terminal 40.

The chat display module 702 controls so as to display a chat screen on the operation panel 401. The UI operation module 703 processes the instruction to the chat application 701 that is input by the user into the operation panel 401. The chat server communication module 704 communicates with the chat server 20 via the wireless LAN communication unit 409.

Next, execution of a print job by the MFP 10 and MFP 11 will be described. Additionally, since the MFP 10 and MFP 11 execute a print job in similar procedures in the embodiment, a case where the MFP 10 executes a print job will be described hereinafter as an example.

Figure 8:
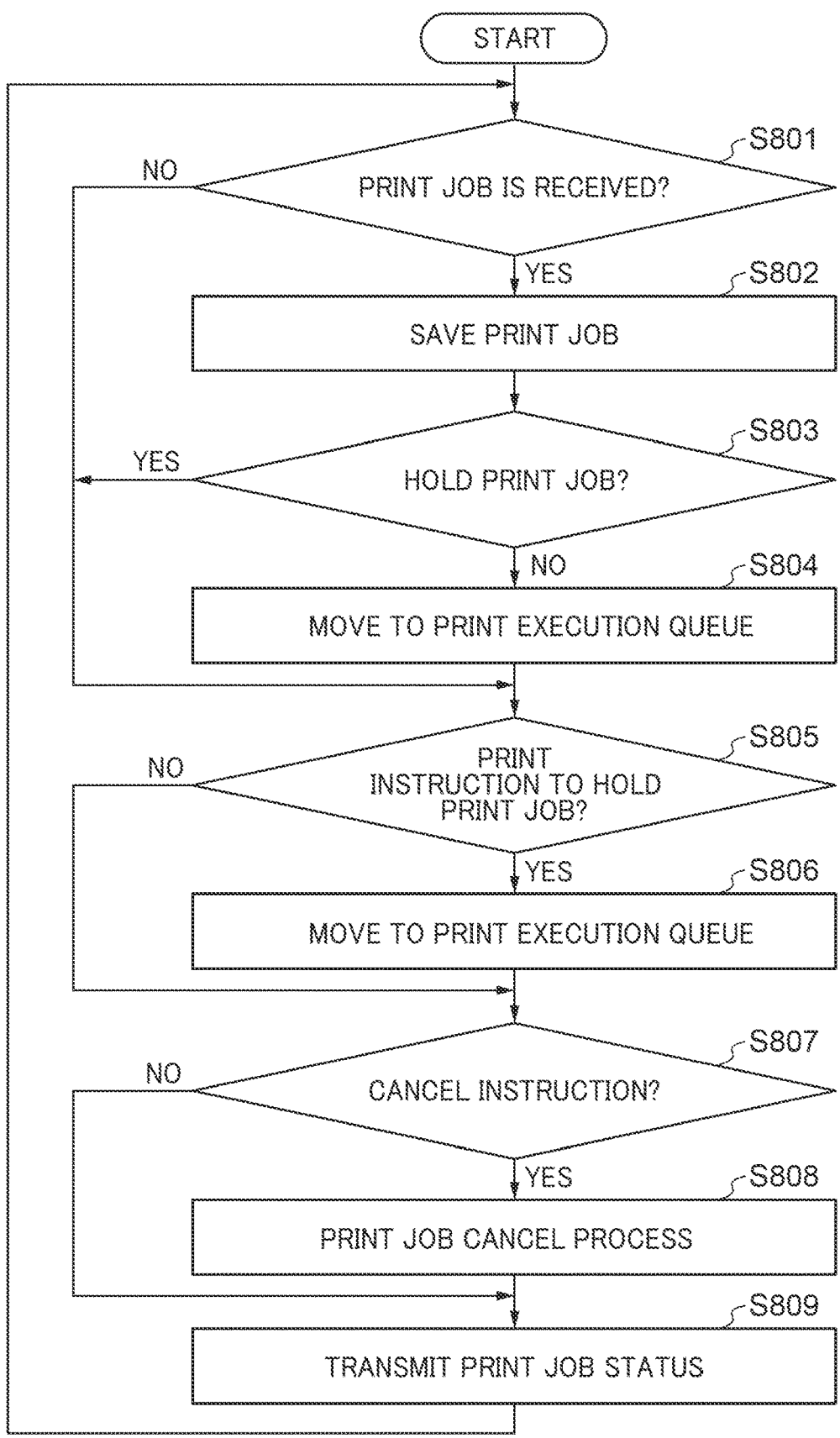
FIG. 8 is a flowchart showing procedures of a print job control process executed by the MFP in FIG. 1.

FIG. 8 is a flowchart showing procedures of a print job control process executed by the MFP 10 in FIG. 1. The print job control process in FIG. 8 is achieved by executing a program stored in the ROM 103 etc. by the CPU 101 of the MFP 10.

As shown in FIG. 8, the CPU 101 determines whether a print job is received by the job control module 502 (a step S801). In the embodiment, the MFP 10 receives a print job by the network communication control module 501 from the information processing apparatus 30, the information processing apparatus 31, the mobile terminal 40, the mobile terminal 41, or the like via the network 60. Additionally, the MFP 10 receives any of a hold print job and a normal print job as a print job. The hold print job is temporarily stored in the HDD 104 and starts the print process with the printer 113 according to a user's print instruction from the operation unit 111 or an external apparatus. The normal print job starts the print process with the printer 113 immediately without being stored in the HDD 104.

When it is determined in the step S801 that a print job is not received, the process proceeds to a step S805 mentioned later. When it is determined in the step S801 that the print job is received, the CPU 101 saves the received print job in the print job storage module 510 (a step S802). Next, the CPU 101 determines whether the received print job is a hold print job (a step S803).

When it is determined in the step S803 that the received print job is a hold print job, the process proceeds to the step S805 mentioned later. When it is determined in the step S803 that the received print job is not a hold print job, the received print job is a normal print job. In this case, the CPU 101 moves the received print job to the print execution queue 511 (a step S804). Print jobs moved to the print execution queue 511 are sequentially processed by the printer control module 503, and the print process is performed by the printer 113. Next, the CPU 101 determines whether a print instruction to the hold print job stored in the print job storage module 510 is received (the step S805).

When it is determined in the step S805 that the print instruction to the hold print job is not received, the process proceeds to a step S807 mentioned later. When it is determined in the step S805 that the print instruction to the hold print job is received, the CPU 101 moves the print job stored in the print job storage module 510 to the print execution queue 511 (a step S806). Thereby, the hold print job that has been stored in the print job storage module 510 is sequentially processed by the printer control module 503, and the print process is performed by the printer 113. Next, the CPU 101 determines whether a cancel instruction to the print job under execution is received (the step S807). In the embodiment, a user can give the cancel instruction from the operation unit 111 or from an external apparatus connected via the network 60, in the same manner as the print instruction.

When it is determined in the step S807 that the cancel instruction to the print job under execution is not received, the process proceeds to a step S809 mentioned later. When it is determined in the step S807 that the cancel instruction to the print job under execution is received, the CPU 101 performs a cancel (stop) process for the print job under execution by the job control module 502 (a step S808). Next, the CPU 101 transmits the print job status that shows the state of the print job processed in the MFP 10 to the chat server 20 (the step S809). The print job status includes various kinds of information set in a management table 1000 in FIG. 10 mentioned later. After that, the process returns to the step S801. In this way, the MFP 10 and MFP 11 repeatedly execute the process in the above mentioned steps S801 through S809. And the print job status updated according to the variation of the state of the print job is transmitted to the chat server 20 from the MFP 10 or the MFP 11.

Figure 9:
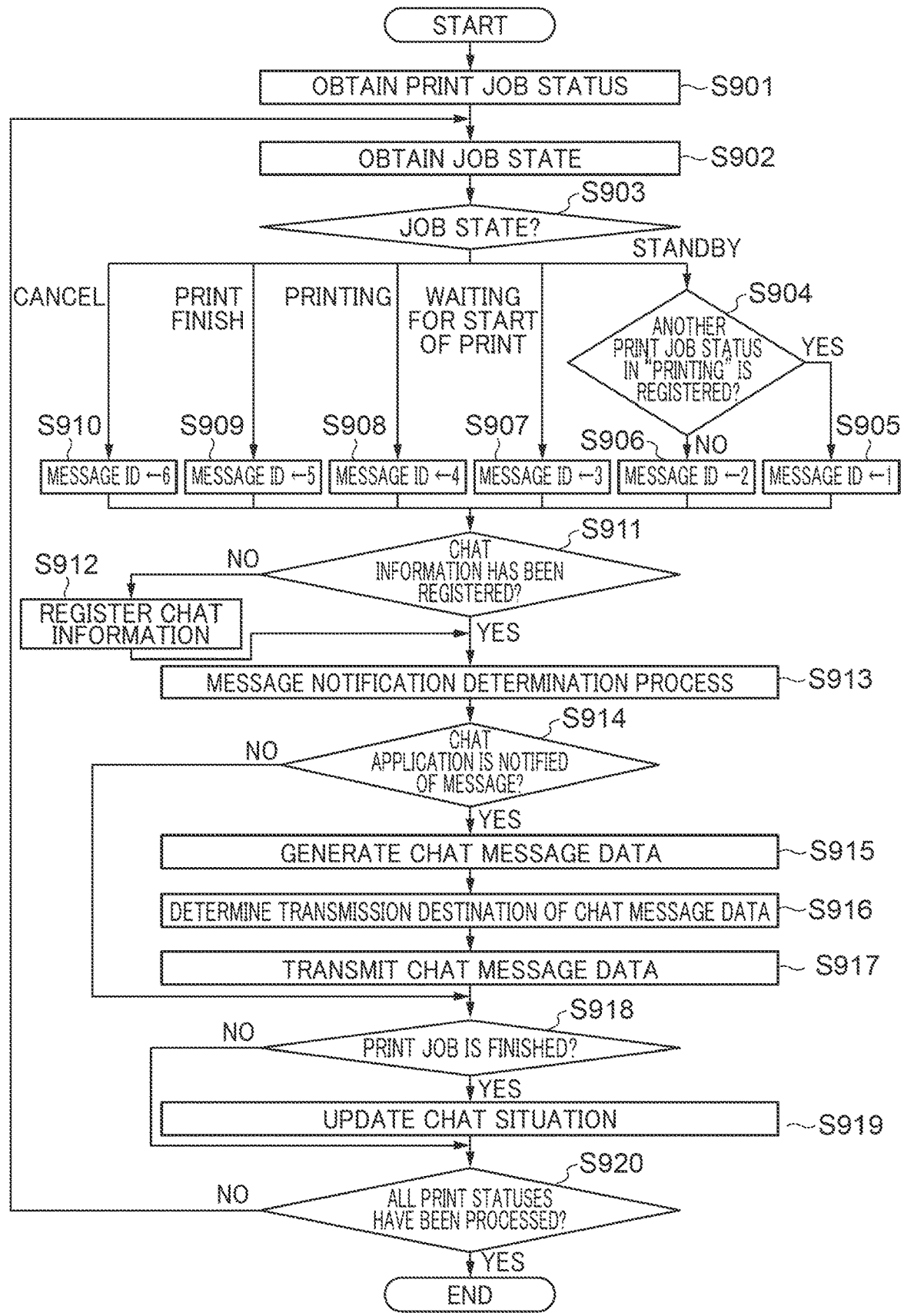
FIG. 9 is a flowchart showing procedures of a notification control process executed by the chat server in FIG. 1.

FIG. 9 is a flowchart showing procedures of a notification control process executed by the chat server 20 in FIG. 1. The notification control process in FIG. 9 is achieved by executing the chatbot program 601 stored in the ROM 123 by the CPU 121 of the chat server 20. In the notification control process in FIG. 9, the chat application 701 running on the mobile terminal 40 or the mobile terminal 41 is notified of a message on the basis of the print job status received from the MFP 10 or the MFP 11. The notification control process in FIG. 9 is executed at a timing at which the chat server 20 receives the print job status from the MFP 10 or the MFP 11, for example.

In FIG. 9, the CPU 121 obtains the print job status from the MFP 10 or the MFP 11 first (a step S901). The CPU 121 registers the print job status obtained from an apparatus, such as the MFP 10 or the MFP 11, into the management table 1000 in FIG. 10. The management table 1000 is stored in the HDD 124 etc. The management table 1000 includes a variation time 1001, a user ID 1002, an image forming apparatus ID 1003, a job ID 1004, a file name 1005, and a job type 1006. The management table 1000 further includes a job state 1007, a job acceptance time 1008, a print start time 1009, and a print finish time 1010.

A time at which a status of a print job varies is set in the variation time 1001. An ID showing a user who instructs to input a print job is set in the user ID 1002. An ID showing a MFP to which the print job is input is set in the image forming apparatus ID 1003. An ID identifying the print job in the MFP to which the print job is input is set in the job ID 1004. A file name of document data or image data set in the print job is set in the file name 1005.

Information showing a type of the print job, such as "normal print" showing a normal print job or "hold print" showing a hold print job, is set in the job type 1006. Information showing the state of the print job, such as "standby", "waiting for start of print", "printing", a "print finish", or "cancel", is set in the job state 1007. The "standby" shows a state where a hold print job is still stored in the print job storage module 510 without moving to the print execution queue 511. The "waiting for start of print" shows a state where the print job is moved to the print execution queue 511 but the print process with the printer 113 is not started. The "printing" shows that the printer 113 is executing the print process of the print job. The "print finish" shows a state where the printer 113 completes the print process of the print job. The "cancel" shows a state where the print job is cancelled according to a cancel instruction by a user.

A time at which the apparatus, such as the MFP 10 or the MFP 11, receives the print job is set in the job acceptance time 1008. A time at which the apparatus, such as the MFP 10 or MFP 11, starts the print process of the print job is set in the print start time 1009. A time at which the apparatus, such as the MFP 10 or the MFP 11, finishes the print process of the print job is set in the print finish time 1010.

Next, the CPU 121 obtains one print job status from among the print job statuses registered in the management table 1000. The CPU 121 obtains the job state of the obtained print job status (a step S902). Next, the CPU 121 determines the job state obtained in the step S902 (a step S903) and distributes the process on the basis of the job state concerned.

When it is determined in the step S903 that the job state obtained in the step S902 is "standby", the process proceeds to a step S904. In the step S904, the CPU 121 determines whether another print job status of which the image forming apparatus ID is identical and the job state is "printing" is registered in the management table 1000.

When it is determined in the step S904 that the other print job status of which the image forming apparatus ID is identical and the job state is "printing" is registered in the management table 1000, the CPU 121 determines a message ID as "1" (a step S905). A message ID is an ID of a message template for generating a message given to the chat application 701. Additionally, details of a message template are mentioned later. Next, the process proceeds to a step S911 mentioned later.

When it is determined in the step S904 that the other print job status of which the image forming apparatus ID is identical and the job state is "printing" is not registered in the management table 1000, the CPU 121 determines the message ID as "2" (a step S906). Next, the process proceeds to the step S911 mentioned later.

When it is determined in the step S903 that the job state obtained in the step S902 is "waiting for start of print", the CPU 121 determines the message ID as "3" (a step S907). Next, the process proceeds to the step S911 mentioned later.

When it is determined in the step S903 that the job state obtained in the step S902 is "printing", the CPU 121 determines the message ID as "4" (a step S908). Next, the process proceeds to the step S911 mentioned later.

When it is determined in the step S903 that the job state obtained in the step S902 is "print finish", the CPU 121 determines the message ID as "5" (a step S909). Next, the process proceeds to the step S911 mentioned later.

When it is determined in the step S903 that the job state obtained in the step S902 is "cancel", the CPU 121 determines the message ID as "6" (a step S910). Next, the CPU 121 determines whether the chat information about the print job of the obtained print job status has been registered in a chat information management table 1100 in FIG. 11 (a step S911). The chat information management table 1100 is stored in the HDD 124 etc. The chat information management table 1100 includes a chat management ID 1101, a registration time 1102, a user ID 1103, an image forming apparatus ID 1104, and a job ID 1105. The chat information management table 1100 further includes a job type 1106, a given message ID 1107, a received button 1108, and a chat situation 1109.

An ID that is allocated to chat information at a time when the chat information is registered into the chat information management table 1100 is set in the chat management ID 1101. The time when the chat information is registered to the chat information management table 1100 is set in the registration time 1102. The information obtained from the user ID 1002 of the print job status is set in the user ID 1103. The information obtained from the image forming apparatus ID 1003 of the print job status is set in the image forming apparatus ID 1104. The information obtained from the job ID 1004 of the print job status is set in the job ID 1105.

The information obtained from the job type 1006 of the print job status is set in the job type 1106. The message ID determined in any one of the above-mentioned steps S905 through S910 is set in the given message ID 1107. A type of a button event received from the chat application 701 is set in the received button 1108. In the embodiment, the chat server 20 receives a button event, such as a "print execution button", a "job cancel button", or a "notification OFF button", for example. These respectively show the types of buttons pressed by the user on the chat screen of the chat application 701. Information showing a chat situation with the chat application 701 about the print job is set in the chat situation 1109. For example, when the chat with the chat application 701 about the print job is finished, "finish" indicating this is set in the chat situation 1109 corresponding to the print job concerned.

In the step S911, when the chat information that includes the same image forming apparatus ID and job ID as the obtained print job status is registered in the chat information management table 1100, it is determined that the chat information about the print job of the obtained print job status has been registered in the chat information management table 1100. In the meantime, when the chat information that includes the same image forming apparatus ID and job ID as the obtained print job status is not registered in the chat information management table 1100, it is determined that the chat information about the print job of the obtained print job status is not registered in the chat information management table 1100.

When it is determined in the step S911 that the chat information about the print job of the obtained print job status has been registered in the chat information management table 1100, the process proceeds to a step S913 mentioned later. When it is determined in the step S911 that the chat information about the print job of the obtained print job status is not registered in the chat information management table 1100, the process proceeds to a step S912 mentioned later.

In the step S912, the CPU 121 registers the chat information about the print job of the obtained print job status in the chat information management table 1100. Next, the CPU 121 executes a message notification determination process (the step S913). In the message notification determination process, when the received button 1108 of the chat information about the print job of the obtained print job status is the "notification OFF button", the CPU 121 sets that the print job concerned is not a message notification target. In the meantime, when the received button 1108 of the chat information about the print job of the obtained print job status is not the "notification OFF button", the CPU 121 sets that the print job concerned is a message notification target. Next, the CPU 121 determines whether the chat application 701 is notified of the message on the basis of the setting in the step S913 (a step S914).

When it is determined in the step S914 that the chat application 701 is not notified of the message, the process proceeds to a step S918 mentioned later. When it is determined in the step S914 that the chat application 701 is notified of the message, the process proceeds to the step S915. In the step S915, the CPU 121 generates chat message data on the basis of the message ID determined in any one of the steps S905 through S910.

FIG. 12 is a view showing examples of message templates used for generating chat message data in the step S915 in FIG. 9. A message template is a template for generating a message given to the chat application 701. In the embodiment, a message template that is different for every message ID is prepared and a content of a given message is changed for every message ID. A message ID 1201 corresponds to the message ID determined in any one of the steps S905 through S910. A message format 1202 is template information that is a base of a message given to the chat application 701. Pieces of information about the print job status are embedded in places of # and { }. For example, when the message ID is determined to "1" in the step S905 to the print status of the variation time "2021/11/11 1:11:00" in FIG. 10, a message of "Hold print (Job ID: 0003, Document name: Bill A) is accepted. Print cannot be executed for some time because another user is printing currently." is generated. Such a message is included in the chat message data.

Moreover, reply button information 1203 that is information about an operation button that is used to instruct a reply to the above-mentioned message is also included in the chat message data. The CPU 121 can obtain the reply button information 1203 from the message template. For example, when the message ID is "1" and the job type is "hold print", the reply button information includes the "job cancel button", "print execution button", and "notification OFF button."

Furthermore, the chat message data includes the chat management ID 1101 and image forming apparatus ID 1104 of the chat information management table 1100. Although the configuration that the chat server 20 generates the chat message data on the basis of the message ID determined in any one of the steps S905 through S910 is described in the embodiment, this configuration is not indispensable. For example, the chat server 20 may transmit the message ID determined in any one of the steps S905 through S910 to the mobile terminal 40 or the mobile terminal 41. In this case, the mobile terminal 40 or the mobile terminal 41 generates the chat message data on the basis of the received message ID and the message template mentioned above.

Next, the CPU 121 determines a transmission destination of the chat message data (a step S916). The transmission destination is determined using chat-application login user information. The chat-application login user information is user information sent from the mobile terminal 40 or the mobile terminal 41, and is managed by the chat application user management module 603.

The following table 1 is an example of the chat-application login user information.

TABLE 1

| USER ID | USING TERMINAL ID | LOGIN STATE |
| --- | --- | --- |
| USER A | MOBILE TERMINAL A | DURING LOGIN |
| USER A | MOBILE TERMINAL C | DURING LOGOUT |
| USER B | MOBILE TERMINAL B | DURING LOGIN |
| USER C | MOBILE TERMINAL D | DURING LOGOUT |

A user ID is an ID identifying a user. The same ID as the user ID of the print job status is set in the user ID. A using terminal ID is an ID identifying an apparatus, such as the mobile terminal 40 or the mobile terminal 41, that is equipped with the chat application 701 and is used by the user. A login state is information showing whether the chat application 701 is started so as to be communicable with the chat server 20. The login state of "during login" shows that the chat application 701 in an apparatus, such as the mobile terminal 40 or the mobile terminal 41, is started and the apparatus concerned is communicable with the chat server 20. The login state of "during logout" shows that the chat application 701 in an apparatus, such as the mobile terminal 40 or the mobile terminal 41, is not started and the apparatus concerned is incommunicable with the chat server 20.

In the step S916, the CPU 121 specifies the chat-application login user information of which the user ID is the same as that in the obtained print job status and of which the login state is "during login". The CPU 121 determines the apparatus that is shown by the using terminal ID of the specified chat-application login user information as the transmission destination.

In the next step S917, the CPU 121 transmits the chat message data generated in the step S915 to the transmission destination determined in the step S916. Next, the CPU 121 determines whether the print job is finished (a step S918). In the step S918, when the job state of the obtained print job status is "cancel" or "print finish", the CPU 121 determines that the print job is finished. In the meantime, when the job state of the obtained print job status is neither "cancel" nor "print finish", the CPU 121 is determined that the print job is not finished.

When it is determined in the step S918 that the print job is not finished, the process proceeds to a step S920 mentioned later. When it is determined in the step S918 that the print job is finished, the process proceeds to a step S919. In a step S919, the CPU 121 updates the chat situation 1109 of the chat information corresponding to the obtained print job status in the chat information management table 1100 to "finish". Next, the CPU 121 determines whether all the print job statuses registered in the management table 1000 have been processed (the step S920).

When it is determined in the step S920 that at least one print job status registered in the management table 1000 has not been processed, the process returns to the step S902. When it is determined in the step S920 that all the print job statuses registered in the management table 1000 have been processed, the CPU 121 finishes this process.

According to the notification control process in FIG. 9 mentioned above, the mobile terminal 40 or the mobile terminal 41 that is used by the user who instructs execution of the print job is notified of the message corresponding to the status of the print job in real time.

Additionally, although the execution timing of the notification control process in FIG. 9 is described as the timing at which the chat server 20 receives the print job status from the MFP 10 or the MFP 11 in the embodiment, this timing is not indispensable. For example, the notification control process in FIG. 9 may be periodically executed at predetermined intervals.

Figure 13:
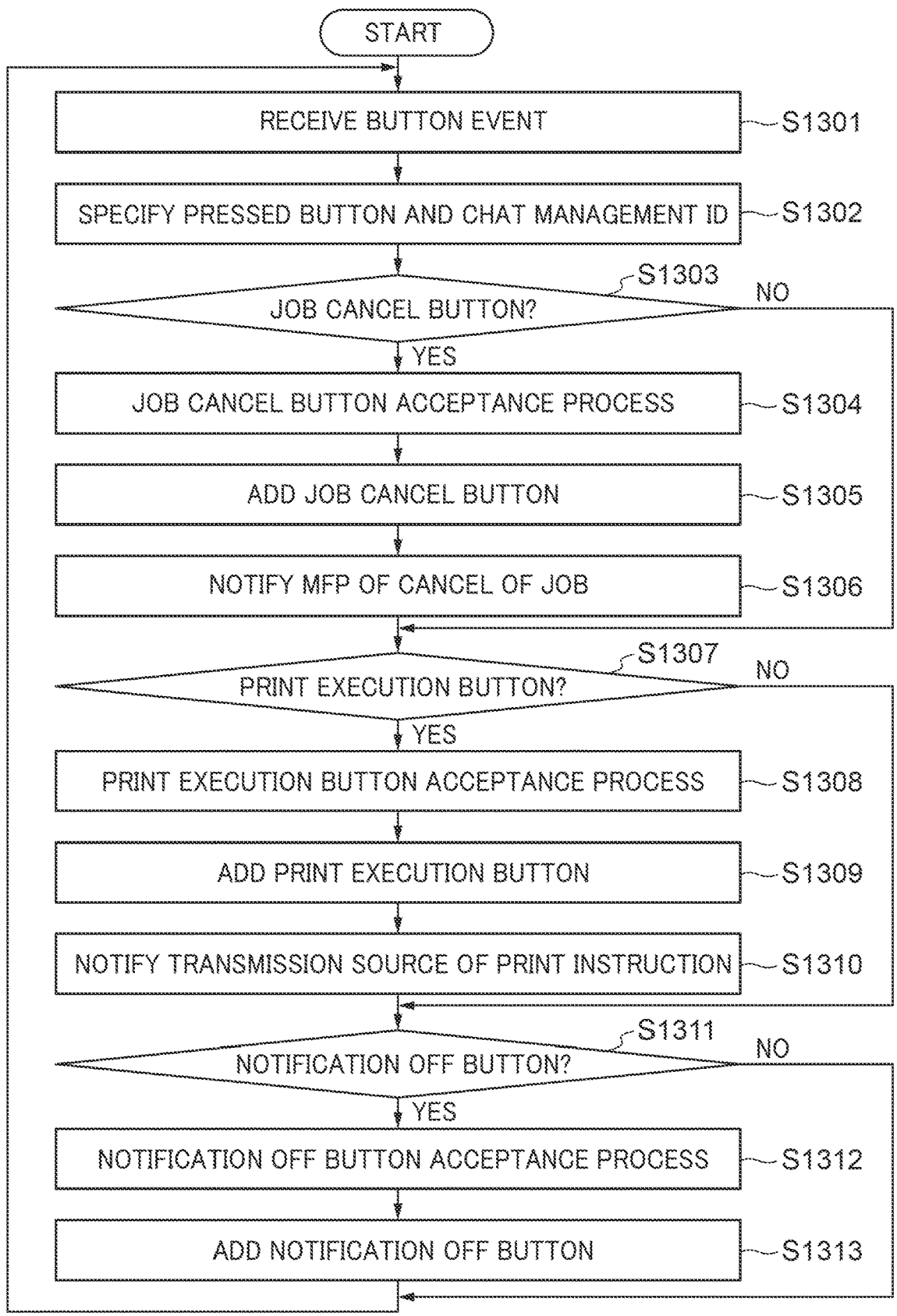
FIG. 13 is a flowchart showing procedures of a button event control process executed by the chat server in FIG. 1.

FIG. 13 is a flowchart showing procedures of a button event control process executed by the chat server 20 in FIG. 1. The button event control process in FIG. 13 is achieved by executing the chatbot program 601 stored in the ROM 123 by the CPU 121 of the chat server 20. The button event control process in FIG. 13 is executed in parallel with the notification control process in FIG. 9, for example.

As shown in FIG. 13, the CPU 121 receives a button event from the chat application 701 that runs on the mobile terminal 40 or the mobile terminal 41 (a step S1301). In the embodiment, as mentioned above, the chat server 20 receives a button event, such as the "print execution button", the "job cancel button", or the "notification OFF button", for example. Next, the CPU 121 specifies a pressed button and the chat management ID 1101 on the basis of the received button event and the information about the transmission source of the button event concerned (step S1302). Next, the CPU 121 determines whether the button specified in the step S1302 is the "job cancel button" (a step S1303).

When it is determined in the step S1303 that the button specified in the step S1302 is not the "job cancel button", the process proceeds to a step S1307 mentioned later. When it is determined in the step S1303 that the button specified in the step S1302 is the "job cancel button", the CPU 121 executes a job cancel button acceptance process (a step S1304). In the job cancel button acceptance process, the CPU 121 notifies the button event transmission source of a message showing that the operation instruction of the job cancel button is accepted. Next, the CPU 121 adds the "job cancel button" to the received button 1108 of the chat information corresponding to the chat management ID specified in the step S1302 in the chat information management table 1100 (a step S1305). Next, the CPU 121 notifies the MFP, which is shown by the image forming apparatus ID 1104 of the chat information corresponding to the chat management ID specified in the step S1302 in the chat information management table 1100, of the cancel of the print job shown by the job ID 1105 of the chat information concerned (a step S1306) (a print job cancel control unit). Next, the CPU 121 determines whether the button specified in the step S1302 is the "print execution button" (a step S1307).

When it is determined in the step S1307 that the button specified in the step S1302 is not the "print execution button", the process proceeds to a step S1311 mentioned later. When it is determined in the step S1307 that the button specified in the step S1302 is the "print execution button", the CPU 121 executes a print execution button acceptance process (a step S1308). In the print execution button acceptance process, the CPU 121 notifies the button event transmission source of a message showing that the operation instruction of the print execution button is accepted. Next, the CPU 121 adds the "print execution button" to the received button 1108 of the chat information corresponding to the chat management ID specified in the step S1302 in the chat information management table 1100 (a step S1309). Next, the CPU 121 notifies the MFP, which is shown by the image forming apparatus ID 1104 of the chat information corresponding to the chat management ID specified in the step S1302 in the chat information management table 1100, of the print instruction of the print job shown by the job ID 1105 of the chat information concerned (a step S1310) (a print job execution control unit). Next, the CPU 121 determines whether the button specified in the step S1302 is the "notification OFF button" (the step S1311).

When it is determined in the step S1311 that the button specified in the step S1302 is not the "notification OFF button", the process returns to the step S1301. When it is determined in the step S1311 that the button specified in the step S1302 is the "notification OFF button", the CPU 121 executes a notification OFF button acceptance process (a step S1312). In the notification OFF button acceptance process, the CPU 121 notifies the button event transmission source of a message showing that the operation instruction of the notification OFF button is accepted. Next, the CPU 121 adds the "notification OFF button" to the received button 1108 of the chat information corresponding to the chat management ID specified in the step S1302 in the chat information management table 1100 (a step S1313). After that, the process returns to the step S1301.

According to the button event control process in FIG. 13, the instruction input by the user by operating the mobile terminal 40 or the mobile terminal 41 is output to the MFP 10 or the MFP 11 that executes the print job via the chat server 20. That is, the user can instruct the MFP 10 or the MFP 11 to execute a hold print job and to cancel the print job under execution by operating the mobile terminal 40 or the mobile terminal 41. Moreover, when the notification of the message about the print job is unnecessary, the user can turn OFF the notification of the message concerned by operating the mobile terminal 40 or the mobile terminal 41.

Next, display of a message by the mobile terminal 40 and mobile terminal 41 will be described. Since the mobile terminal 40 and the mobile terminal 41 display a message in a similar procedure in the embodiment, hereinafter, a case where the mobile terminal 40 displays a message will be described, as an example.

Figure 14:
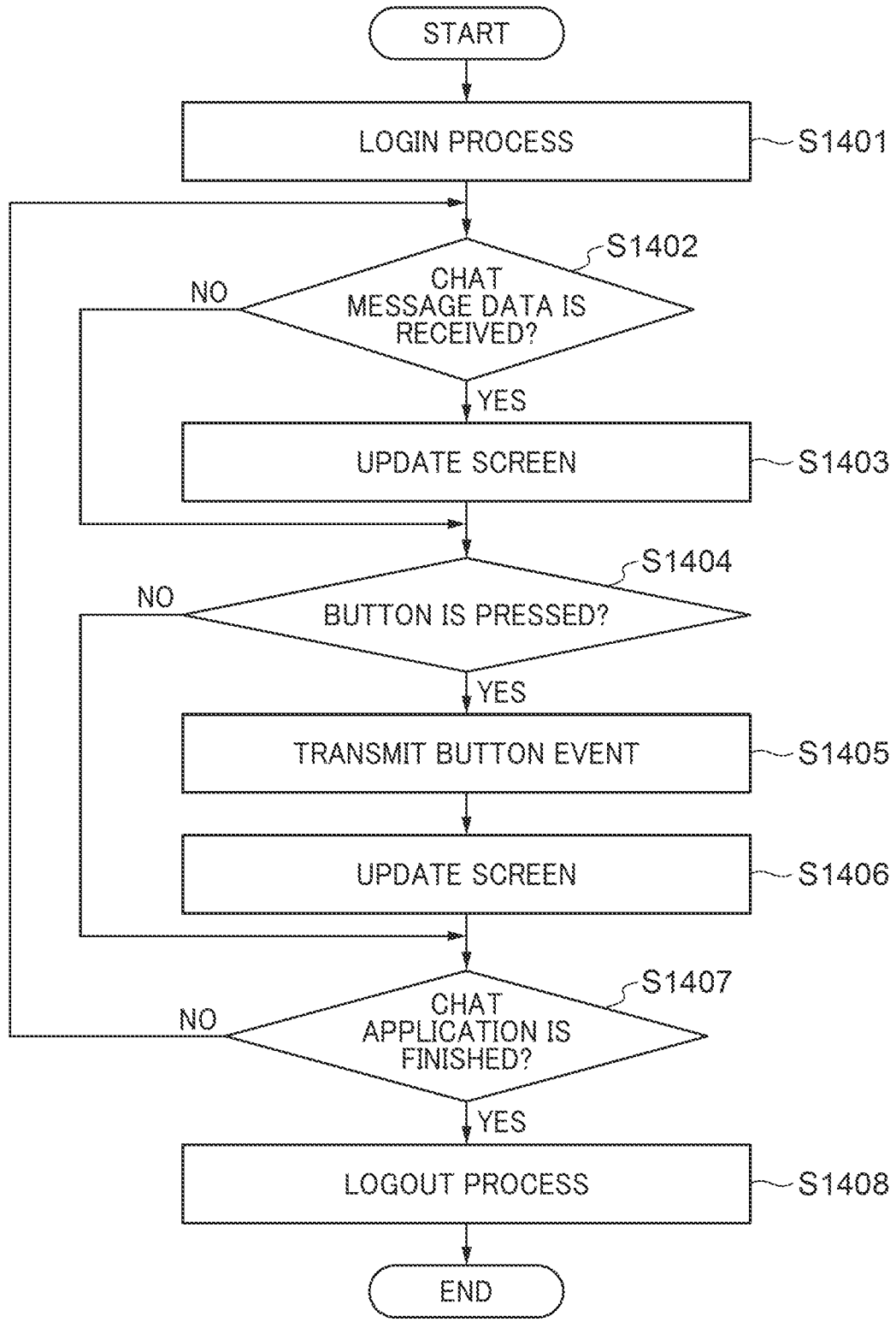
FIG. 14 is a flowchart showing procedures of a message display control process executed by the mobile terminal in FIG. 1.

FIG. 14 is a flowchart showing procedures of a message display control process executed by the mobile terminal 40 in FIG. 1. The message display control process in FIG. 14 is achieved by executing a program stored in the ROM 403 etc. by the CPU 402. Additionally, in the message display control process in FIG. 14, it is assumed that the chat application 701 has been already started in the mobile terminal 40.

As shown in FIG. 14, the CPU 402 performs a login process to log in the chat server 20 (a step S1401). Specifically, the CPU 402 transmits user information that includes a user ID of a user who has the mobile terminal 40, a using terminal ID of the mobile terminal 40, a login request, etc. to the chat server 20. The chat server 20 manages the received user information as the Table 1. Next, the CPU 402 determines whether the chat message data is received from the chat server 20 (a step S1402).

When it is determined in the step S1402 that the chat message data is not received from the chat server 20, the process proceeds to a step S1404 mentioned later. When it is determined in the step S1402 that the chat message data is received from the chat server 20, the CPU 402 updates a screen displayed on the operation panel 401 on the basis of the received chat message data (a step S1403). Additionally, the details of the screen displayed on the operation panel 401 are mentioned later. Next, the CPU 402 determines whether the button displayed on the operation panel 401 in the step S1403 is pressed (a step S1404).

When it is determined in the step S1404 that the button displayed on the operation panel 401 in the step S1403 is not pressed, the process proceeds to a step S1407 mentioned later. When it is determined in the step S1404 that the button displayed on the operation panel 401 in the step S1403 is pressed, the process proceeds to a step S1405. In the step S1405, the CPU 402 transmits a button event, which includes button information that shows the type of the pressed button and the chat management ID included in the chat message data, to the chat server 20. Next, the CPU 402 updates the screen displayed on the operation panel 401 to a display content corresponding to the type of the pressed button (a step S1406). Next, the CPU 402 determines whether the chat application 701 is finished (the step S1407).

When it is determined in the step S1407 that the chat application 701 is not finished, the process returns to the step S1402. When it is determined in the step S1407 that the chat application 701 is finished, the CPU 402 performs a logout process to log out from the chat server 20 (a step S1408). Specifically, the CPU 402 transmits user information that includes the user ID of the user who has the mobile terminal 40, the using terminal ID of the mobile terminal 40, a logout request, etc. to the chat server 20. The chat server 20 that receives the user information updates the login state corresponding to this user information to "during logout". After that, this process is finished.

Figure 15:
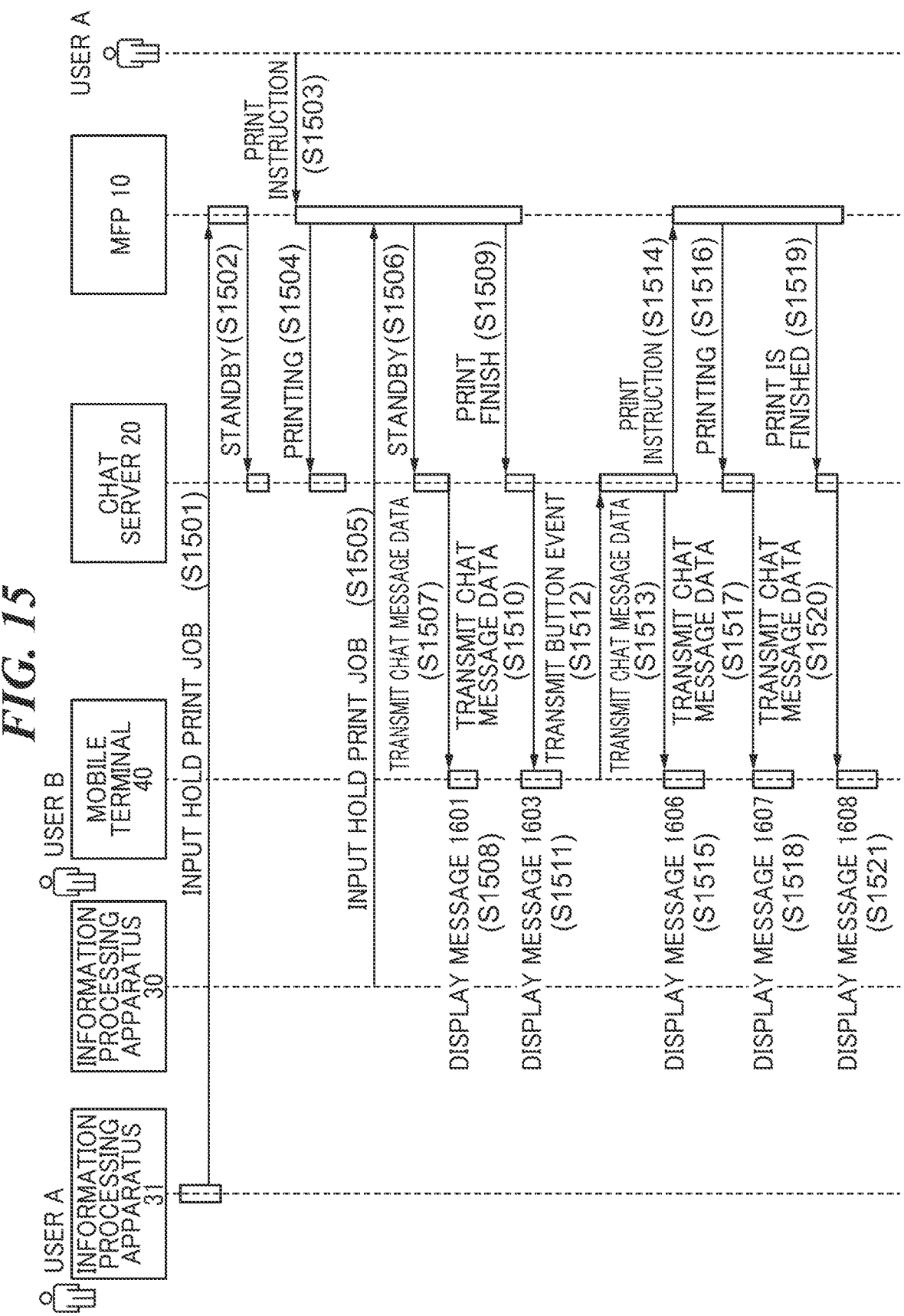
FIG. 15 is a sequence chart showing an example of chat notification performed by the image forming system in FIG. 1.

FIG. 15 is a sequence chart showing an example of chat notification performed by the image forming system 1 in FIG. 1. Additionally, in FIG. 15, it is assumed that the mobile terminal 40 used by a user B logs in the chat server 20 and that the mobile terminal 41 used by a user A does not log in the chat server 20.

As shown in FIG. 15, the user A operates the information processing apparatus 31 to input a hold print job from the information processing apparatus 31 to the MFP 10 (a step S1501). The MFP 10 that receives the hold print job transmits the print job status of which the job state 1007 is "standby" to the chat server 20 (a step S1502). Next, the user A operates the operation unit 111 of the MFP 10 to give a print instruction of the hold print job input in the step S1501 (a step S1503). The MFP 10 that receives the print instruction starts the print process of the hold print job input in the step S1501. Moreover, the MFP 10 transmits the print job status of which the job state 1007 is "printing" to the chat server 20 (a step S1504).

After that, the user B operates the information processing apparatus 30 to input a hold print job from the information processing apparatus 30 to the MFP 10 (a step S1505). Since the MFP 10 that receives this hold print job is executing the hold print job input in the step S1501, the MFP 10 transmits the print job status of which the job state 1007 is "standby" to the chat server 20 (a step S1506). The chat server 20 transmits the chat message data to the chat application 701 of the mobile terminal 40 used by the user B on the basis of the received print job status (a step S1507). The chat application 701 that receives this chat message data displays a message 1601 (FIG. 16), which shows that the print job is accepted but another user is printing currently, on the operation panel 401 (a step S1508). Moreover, a button group 1602 including the print execution button, the job cancel button, and the notification OFF button is displayed on the operation panel 401 on the basis of the button information included in the received chat message data.

After that, when the print process of the hold print job executed according to the print instruction of the user A in the step S1503 is finished, the process proceeds to a step S1509. In the step S1509, the MFP 10 transmits the print job status of which the job state 1007 is "print finish" to the chat server 20. The chat server 20 that receives this print job status transmits the chat message data including a message showing that the hold print job under standby is executable to the mobile terminal 40 used by the user B (a step S1510). The chat application 701 that receives this chat message data displays a message 1603, which shows that the hold print job under standby is executable, on the operation panel 401 (a step S1511). Thereby, even if the user is apart from the MFP 10, the user is able to know that the MFP 10 is in a state where the hold print job input by the user concerned is executable. Moreover, a button group 1604 including the print execution button, the job cancel button, and the notification OFF button is displayed on the operation panel 401 on the basis of the button information included in the received chat message data.

Next, when the user B presses the print execution button displayed on the operation panel 401 of the mobile terminal 40, the mobile terminal 40 displays a message 1605 like "print execution", which shows that the pressed button is the print execution button, on the operation panel 401. Thereby, the user can know easily that the pressed button is the print execution button. Moreover, the chat application 701 of the mobile terminal 40 transmits a button event to the chat server 20 (a step S1512). This button event includes the information that shows the pressed print execution button. The chat server 20 that receives this button event transmits chat message data including a message, which shows that the operation instruction of the print execution button is accepted, to the mobile terminal 40 (a step S1513). Moreover, the chat server 20 gives a print instruction of the hold print job input in the step S1505 to the MFP 10 (a step S1514).

The mobile terminal 40 that receives the chat message data transmitted from the chat server 20 in the step S1513 displays a message 1606, which shows that the operation instruction of the print execution button is accepted, on the operation panel 401 (a step S1515).

In the meantime, when receiving the print instruction from the chat server 20, the MFP 10 starts the print process of the hold print job input in the step S1505. Moreover, the MFP 10 transmits the print job status of which the job state 1007 is "printing" to the chat server 20 (a step S1516). The chat server 20 that receives this print job status transmits chat message data including the message of "printing" to the mobile terminal 40 of the user B who is using the chat application 701 (a step S1517). The mobile terminal 40 that receives this chat message data displays a message 1607 showing "printing" on the operation panel 401 (a step S1518). Thereby, even if the user is apart from the MFP 10, the user is able to know that the hold print job input by the user concerned is under execution.

After that, when the print process of the hold print job executed according to the print instruction in the step S1514 is finished, the process proceeds to a step S1519. In the step S1519, the MFP 10 transmits the print job status of which the job state 1007 is "print finish" to the chat server 20. The chat server 20 that receives this print job status transmits chat message data including the message showing "print finish" to the mobile terminal 40 (a step S1520). The mobile terminal 40 that receives this chat message data displays a message 1607 showing "print finish" on the operation panel 401 (a step S1521). Thereby, even if the user is apart from the MFP 10, the user is able to know that the hold print job input by the user concerned is finished.

Figure 16:
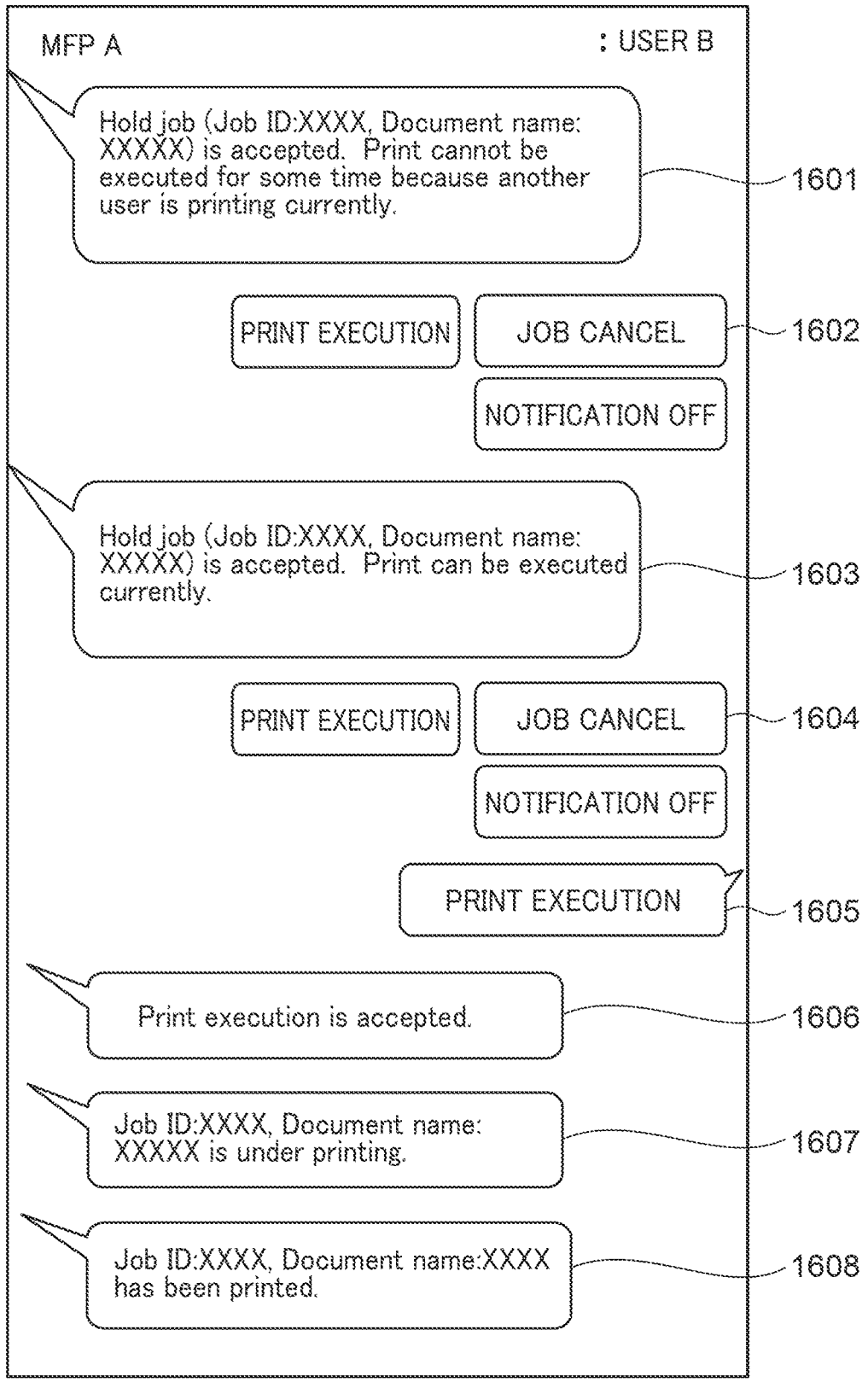
FIG. 16 is a view showing an example of a chat screen displayed on an operation panel in FIG. 4.

In this way, the chat server 20 transmits the chat message data for displaying the various messages shown in FIG. 16 to the mobile terminal 40 that logs in the chat server 20 concerned in the embodiment. In the meantime, the chat server 20 does not transmit the above-mentioned chat message data to the mobile terminal 41 that does not log in the chat server 20 concerned.

According to the above-mentioned embodiment, when the hold print job of the user B is input in the MFP 10 while executing the hold print job of the user A, the message 1601, which shows that the print job of the user B cannot be executed because the hold print job of the user A is under execution, is displayed on the operation panel 401 of the mobile terminal 40. Thereby, even if the user B is apart from the MFP 10, the user B can be notified of the execution situation of the hold print job of the user B input to the MFP 10.

Moreover, when the user B presses the print execution button to the message 1603 displayed on the operation panel 401 of the mobile terminal 40, the MFP 10 executes the hold print job of the user B input to the MFP 10 in the above-mentioned embodiment. Thereby, even if the user B is apart from the MFP 10, the user B can instruct execution of the hold print job of the user B input to the MFP 10.

In the above-mentioned embodiment, it is controlled whether a message is displayed on the operation panel of the apparatus, such as the mobile terminal 40 or the mobile terminal 41, for every print job input to the MFP 10 from the external apparatus. Thereby, a user's intention can be reflected to a message display function for every print job input to the MFP 10, which makes the message display function easy to use.

Figure 17:
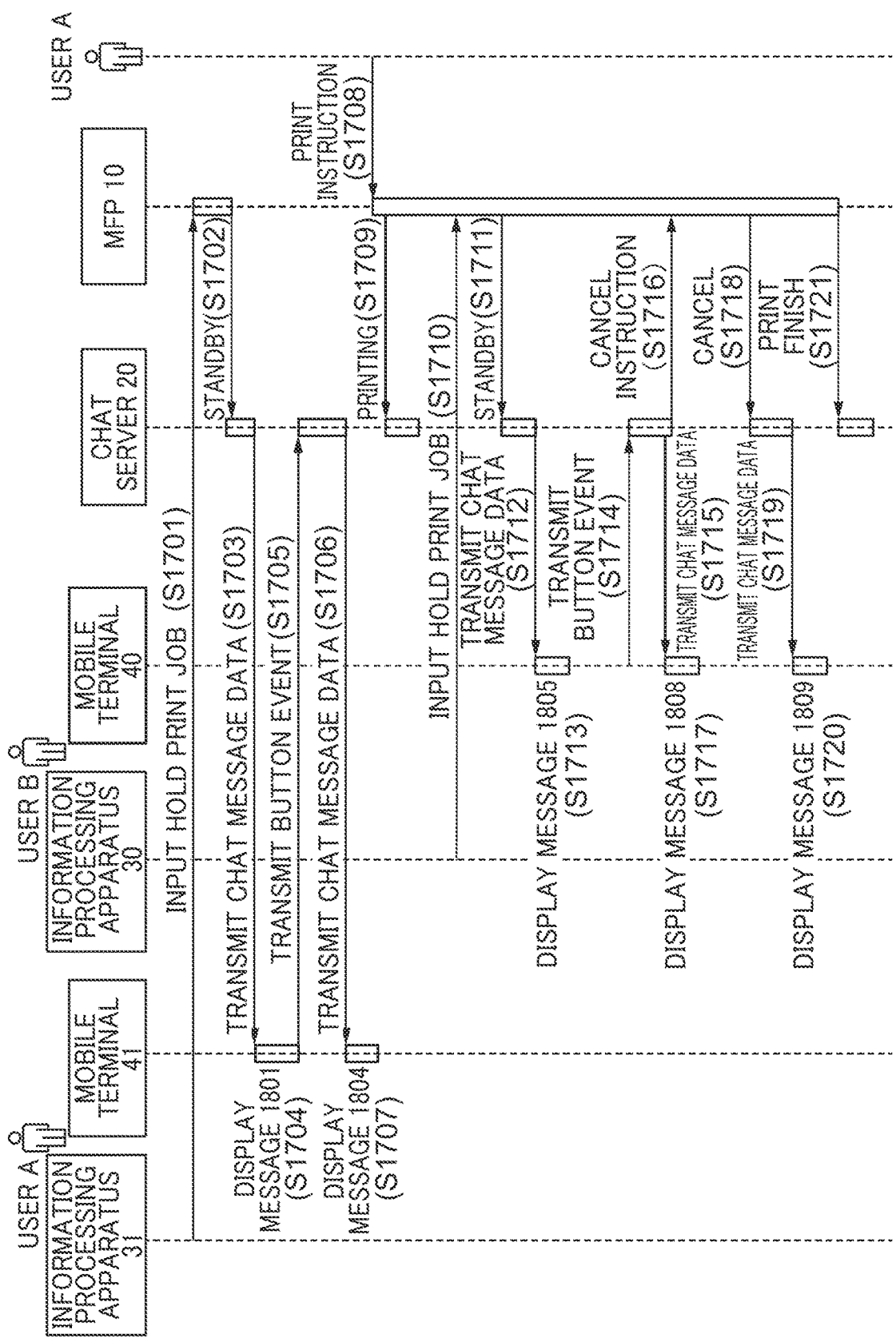
FIG. 17 is a sequence chart showing another example of the chat notification performed by the image forming system in FIG. 1.

FIG. 17 is a sequence chart showing another example of the chat notification performed by the image forming system 1 in FIG. 1. Additionally, in FIG. 17, it is assumed that the mobile terminal 40 used by the user B and the mobile terminal 41 used by the user A log in the chat server 20.

Moreover, hereinafter, a component of the mobile terminal 41 is indicated by a reference numeral that is obtained by adding "a" to a reference numeral of a corresponding component of the mobile terminal 40.

Figure 18A:
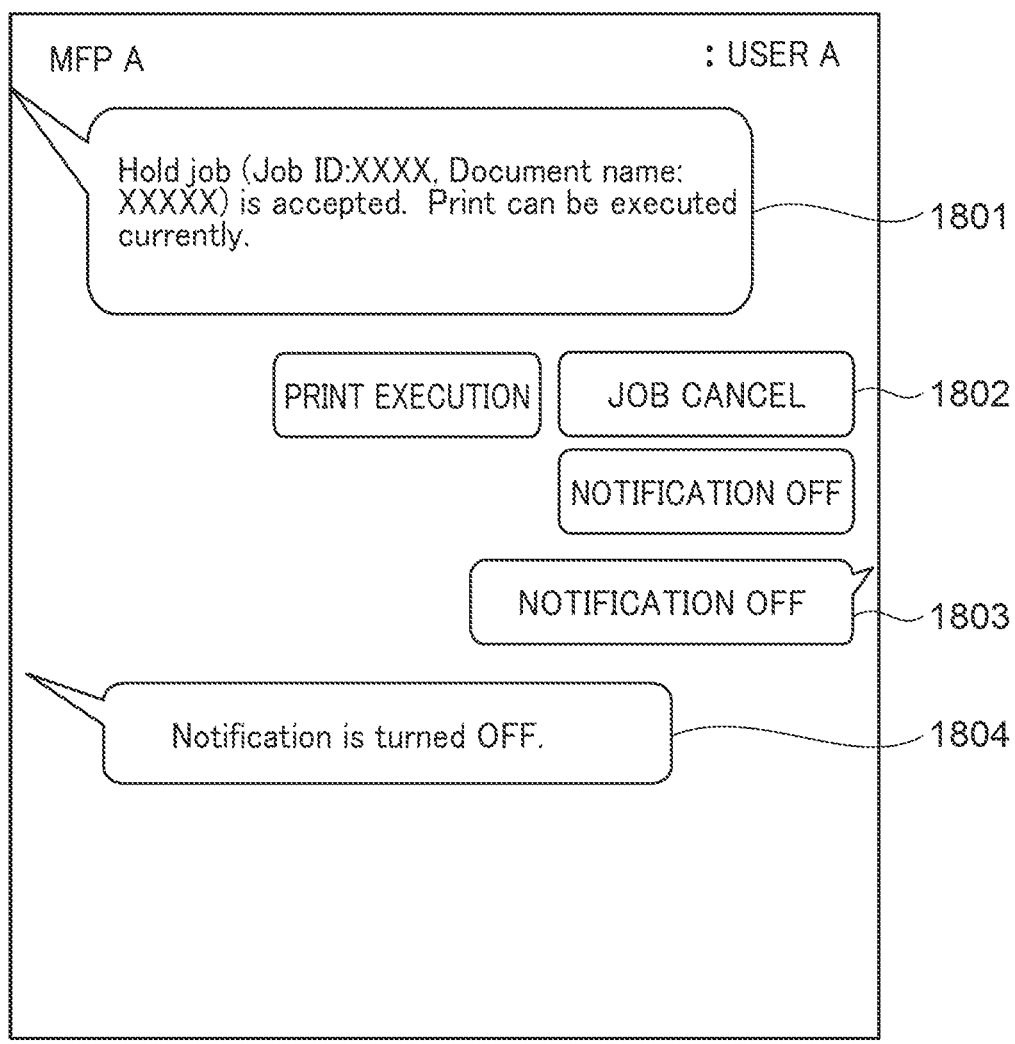
FIG. 18A and FIG. 18B are views showing examples of chat screens displayed on the operation panel in FIG. 4.

As shown in FIG. 17, the user A operates the information processing apparatus 31 to input a hold print job from the information processing apparatus 31 to the MFP 10 (a step S1701). The MFP 10 that receives the hold print job transmits the print job status of which the job state 1007 is "standby" to the chat server 20 (a step S1702). The chat server 20 that receives this print job status transmits the chat message data including a message showing that the hold print job under standby is executable to the mobile terminal 41 used by the user A (a step S1703). The mobile terminal 41 that receives this chat message data displays a message 1801 (FIG. 18A), which shows that the print job is under standby and is executable, on the operation panel 401a of the mobile terminal 41 (a step S1704). Moreover, a button group 1802 including the print execution button, the job cancel button, and the notification OFF button is displayed on the operation panel 401a on the basis of the button information included in the received chat message data. Next, when the user A presses the notification OFF button displayed on the operation panel 401a, the mobile terminal 41 displays a message 1803 like "notification OFF", which shows that the pressed button is the notification OFF button, on the operation panel 401a. Moreover, the chat application 701a of the mobile terminal 41 transmits a button event to the chat server 20 (a step S1705). This button event includes information showing the notification OFF button pressed by the user A.

The chat server 20 that receives this button event sets the chat notification function to the mobile terminal 41 to OFF and transmits chat message data including a message indicating this to the mobile terminal 41 (a step S1706). The mobile terminal 41 that receives this chat message data displays a message 1804, which shows that the chat notification function is set to OFF, on the operation panel 401a (a step S1707). After that, the user A operates the operation unit 111 of the MFP 10 to give a print instruction of the hold print job input in the step S1701 (a step S1708). The MFP 10 that receives the print instruction starts the print process of the hold print job input in the step S1701. Moreover, the MFP 10 transmits the print job status of which the job state 1007 is "printing" to the chat server 20 (a step S1709). Additionally, since the chat notification function to the mobile terminal 41 is set to OFF as mentioned above, the chat server 20 does not transmit the chat message data as a response to the received print job status to the mobile terminal 41. In this way, a user can set the chat notification function to OFF from a mobile terminal that logs in the chat server 20 in the embodiment.

Figure 18B:
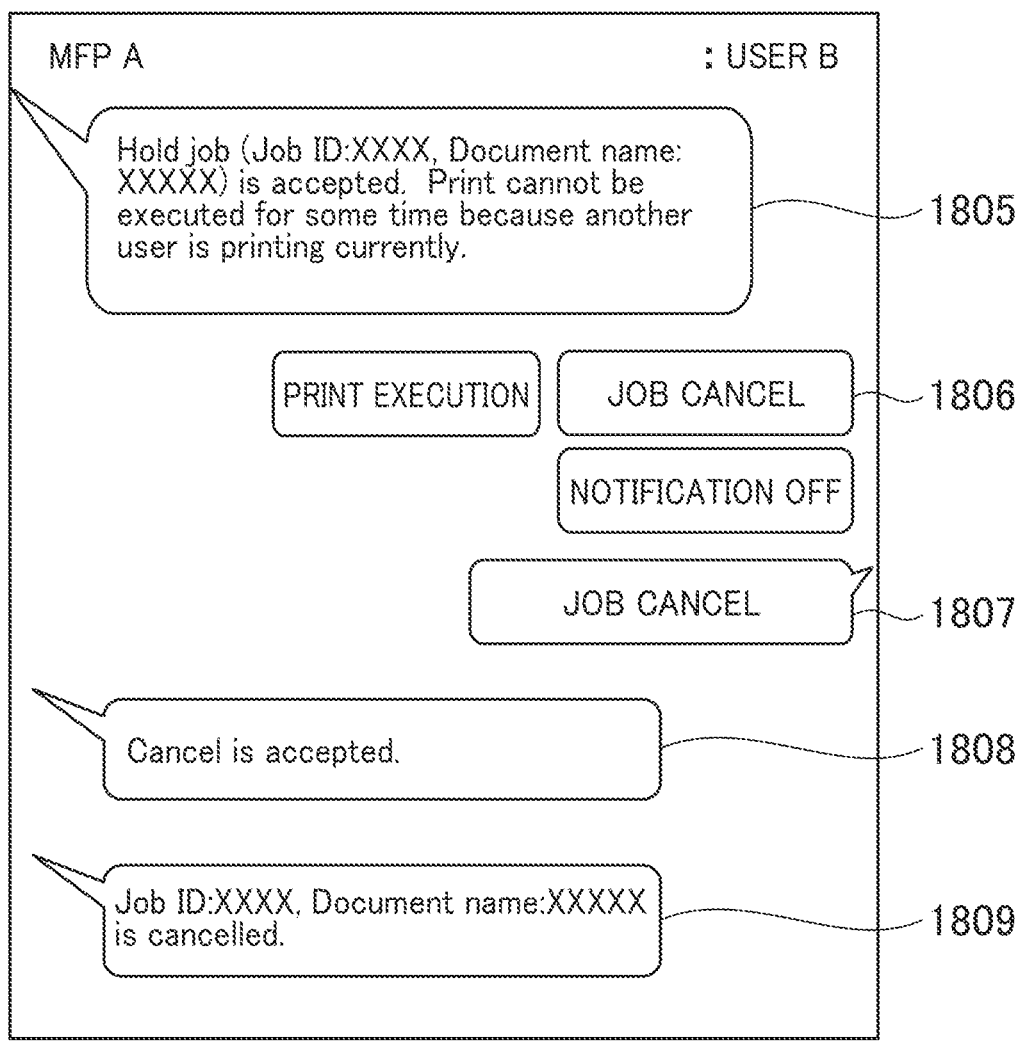

After that, the user B operates the information processing apparatus 30 to input a hold print job from the information processing apparatus 30 to the MFP 10 (a step S1710). Since the MFP 10 that receives this hold print job is executing the hold print job input in the step S1701, the MFP 10 transmits the print job status of which the job state 1007 is "standby" to the chat server 20 (a step S1711). The chat server 20 transmits the chat message data to the chat application 701 of the mobile terminal 40 used by the user B on the basis of the received print job status (a step S1712). The mobile terminal 40 that receives this chat message data displays a message 1805 (FIG. 18B), which shows that the print job is accepted but another user is printing currently, on the operation panel 401 (a step S1713). Moreover, a button group 1806 including the print execution button, the job cancel button, and the notification OFF button is displayed on the operation panel 401 on the basis of the button information included in the received chat message data.

After that, when the user B presses the job cancel button displayed on the operation panel 401, the mobile terminal 40 displays a message 1807 like "job cancel", which shows that the pressed button is the job cancel button, on the operation panel 401. Moreover, the chat application 701 of the mobile terminal 40 transmits a button event to the chat server 20 (a step S1714). This button event includes information showing the job cancel button pressed by the user B. The chat server 20 that receives this button event transmits chat message data including a message, which shows that the operation instruction of the job cancel button is accepted, to the mobile terminal 40 (a step S1715). Moreover, the chat server 20 gives a cancel instruction of the hold print job input in the step S1710 to the MFP 10 (a step S1716).

The mobile terminal 40 that receives the chat message data transmitted from the chat server 20 in the step S1715 displays a message 1808, which shows that the operation instruction of the "job cancel button" is accepted, on the operation panel 401 (a step S1717).

In the meantime, the MFP 10 that receives the cancel instruction from the chat server 20 performs a cancel process of the hold print job input in the step S1710. In this way, a user can check the execution situation of the print job from a mobile terminal that logs in the chat server 20 and also can instruct the cancel of the print job concerned from the mobile terminal in the embodiment. Moreover, the MFP 10 transmits the print job status of which the job state 1007 is "cancel" to the chat server 20 (a step S1718). The chat server 20 that receives this print job status transmits chat message data to the mobile terminal 40 (a step S1719). This chat message data includes a message showing that the hold print job input in the step S1710 is canceled.

The mobile terminal 40 that receives this chat message data displays a message 1809, which shows that the hold print job input in the step S1710 is canceled, on the operation panel 401 (a step S1720). Thereby, the user can easily check that the cancel instruction is accepted from the mobile terminal that logs in the chat server 20.

After that, when the print process of the hold print job executed according to the print instruction of the user A in the step S1708 is finished, the process proceeds to a step S1721. In the step S1721, the MFP 10 transmits the print job status of which the job state 1007 is "print finish" to the chat server 20. After that, this process is finished.

Although the present invention is described using the above-mentioned embodiment, the present invention is not limited to the above-mentioned embodiment. For example, in the message notification determination process in the step S913, it may be controlled whether the chat application 701 is notified of a message on the basis of information about other than the received button 1108 about the chat information (other than the operation button).

Figure 19:
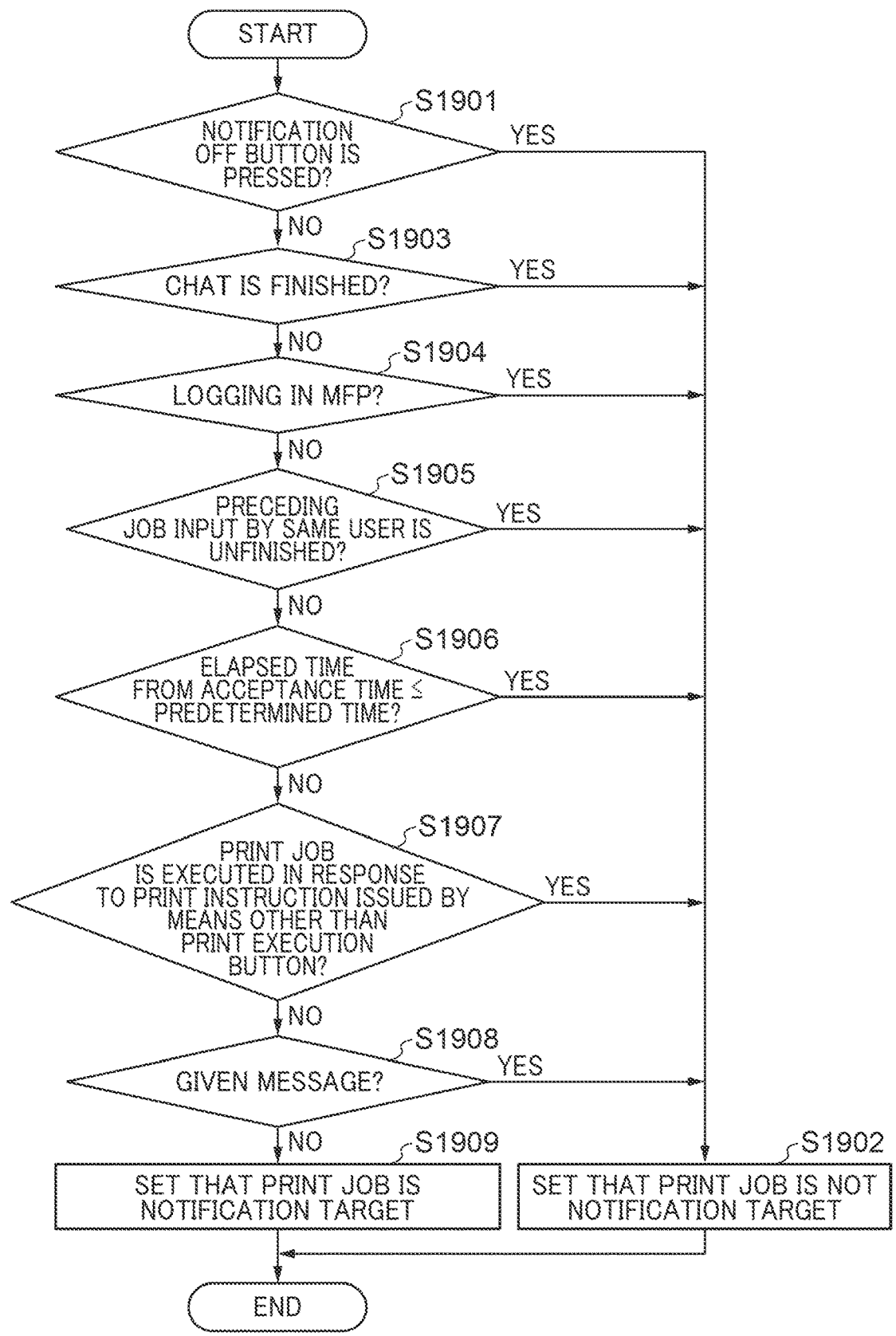
FIG. 19 is a flowchart showing procedures of a message notification determination process in a step S913 in FIG. 9.

FIG. 19 is a flowchart showing other procedures of the message notification determination process in the step S913 in FIG. 9. The message notification determination process in FIG. 19 is achieved by executing the chatbot program 601 stored in the ROM 123 by the CPU 121 of the chat server 20.

As shown in FIG. 19, the CPU 121 determines whether the notification OFF button is pressed during the chat of the print job of the obtained print job status (step S1901). In the step S1901, when the received button 1108 of the chat information about the above-mentioned print job is the "notification OFF button", the CPU 121 determines that the notification OFF button is pressed during the chat of the print job, for example. In the meantime, when the received button 1108 of the chat information about the above-mentioned print job is not the "notification OFF button", the CPU 121 determines that the notification OFF button is not pressed during the chat of the print job.

When it is determined in the step S1901 that the notification OFF button is pressed during the chat of the above-mentioned print job, the CPU 121 sets that the above-mentioned print job is not a message notification target (a step S1902), and finishes this process.

When it is determined in the step S1901 that the notification OFF button is not pressed during the chat of the above-mentioned print job, the process proceeds to a step S1903. In the step S1903, the CPU 121 determines whether the chat of the above-mentioned print job is finished on the basis of the chat situation in the above-mentioned chat information.

When it is determined in the step S1903 that the chat of the above-mentioned print job is finished, the process proceeds to the step S1902. This can prevent repeated notification of a message about a print job of which a print process is already completed.

When it is determined in the step S1903 that the chat of the above-mentioned print job is not finished, the CPU 121 determines whether the user who inputs the above-mentioned print job is currently logging in the MFP of the input destination of the above-mentioned print job (step S1904). In the embodiment, the MFP user management module 607 manages login states of a user to each MFP as shown in the following table 2. The CPU 121 determines in the step S1904 on the basis of this information.

TABLE 2

| USER ID | IMAGE FORMING APPARATUS ID | LOGIN STATE |
|---|---|---|
| USER B | MFP B | DURING LOGIN |
| USER A | MFP A | DURING LOGOUT |

When it is determined in the step S1904 that the user who inputs the above-mentioned print job is currently logging in the MFP of the input destination of the above-mentioned print job, the process proceeds to the step S1902. Since the user who logs in the MFP of the input destination of the print job can grasp the situation of the print job concerned from the operation unit of the MFP concerned, it is unnecessary to notify the mobile terminal used by such a user of the above-mentioned messages of the chat. Accordingly, in the embodiment, when it is determined that the user who inputs the above-mentioned print job is currently logging in the MFP of the input destination of the above-mentioned print job, the CPU 121 sets that the above-mentioned print job is not the message notification target. Thereby, when the user logs in the MFP of the input destination of the print job, the notification of unnecessary messages to the mobile terminal used by the user concerned can be reduced.

When it is determined in the step S1904 that the user who inputs the above-mentioned print job is not currently logging in the MFP of the input destination of the above-mentioned print job, the process proceeds to a step S1905. In the step S1905, the CPU 121 determines whether another print job that was input by the user who inputs the above-mentioned print job prior to the above-mentioned print job is unfinished. Additionally, another print job is indicated as a "preceding job" in FIG. 19 In the step S1905, for example, when a print job status of which the user ID and image forming apparatus ID are the same as that of the above-mentioned print job, of which the job acceptance time is earlier than that of the above-mentioned print job, and of which the job state is other than "print finish" is registered in the management table 1000, it is determined that another print job that was input by the user who inputs the above-mentioned print job prior to the above-mentioned print job is unfinished. In the meantime, when the print job status that satisfies such conditions is not registered in the management table 1000, it is determined that there is not another unfinished print job that was input by the user who inputs the above-mentioned print job prior to the above-mentioned print job.

When it is determined in the step S1905 that the other print job that was input by the user who inputs the above-mentioned print job prior to the above-mentioned print job is unfinished, the process proceeds to the step S1902. At this time, for example, when the user is notified of the message showing that another user is printing currently about the other print job previously input by the chat, the notification of the similar message is unnecessary about the print job input later than the other print job. Accordingly, in the embodiment, when the other preceding print job input by the user who inputs the above-mentioned print job prior to the above-mentioned print job is unfinished, the CPU 121 sets that the above-mentioned print job is not the message notification target. This can reduce superfluous notification of the messages of the chat.

When it is determined in the step S1905 that there is not another unfinished print job that was input by the user who inputs the above-mentioned print job prior to the above-mentioned print job, the process proceeds to a step S1906. In the step S1906, the CPU 121 determines whether elapsed time from the acceptance time of the above-mentioned print job is not more than a predetermined time. Specifically, the CPU 121 determines whether the elapsed time from the job acceptance time of the obtained print job status is not more than the predetermined time.

When it is determined in the step S1906 that the elapsed time from the acceptance time of the above-mentioned print job is not more than the predetermined time, the process proceeds to the step S1902. For example, since a user who is in a hurry to print travels to the MFP of the input destination immediately after inputting a print job and checks the state of the MFP concerned directly in order to receive printed matter immediately, the possibility of not checking the above-mentioned message of the chat is extremely high. Instead when such a user is notified of the above-mentioned message of the chat immediately after the acceptance time of the above-mentioned print job, there is fear of feeling troublesome. Accordingly, in the embodiment, when the elapsed time from the acceptance time of the above-mentioned print job is not more than the predetermined time, the CPU 121 sets that the above-mentioned print job is not the message notification target. This can reduce superfluous notification of the messages of the chat.

When it is determined in the step S1906 that the elapsed time from the acceptance time of the above-mentioned print job is more than the predetermined time, the process proceeds to the step S1907. In the step S1907, the CPU 121 determines whether the hold print job is executed according to the print instruction issued by a means other than the print execution button mentioned above. Additionally, in the embodiment, the CPU 121 determines that the print instruction is issued by pressing the print execution button when the "print execution button" is included in the received button of the above-mentioned chat information.

When it is determined in the step S1907 that the hold print job is executed according to the print instruction issued by the means other than the print execution button mentioned above, it is exactly a case where the user directly issues the print instruction from the operation unit 111 of the MFP body. In such a case, the process proceeds to the step S1902. This prevents an unnecessary notification of the chat to the user who is so near the MFP that a direct operation is available.

When it is determined in the step S1907 that the hold print job is executed according to the print instruction issued by the print execution button, the process proceeds to a step S1908. In the step S1908, the CPU 121 determines whether a notification scheduled message is a message that has been given to the chat application 701. Specifically, the CPU 121 determines whether the message ID determined in any one of the above-mentioned steps S905 through S910 is included in the above-mentioned chat information. When the above-mentioned determined message ID is included in the above-mentioned chat information, it is determined that the notification scheduled message is a message that has been given to the chat application 701. In the meantime, when the above-mentioned determined message ID is not included in the above-mentioned chat information, it is determined that the notification scheduled message is not a message that has been given to the chat application 701.

When it is determined in the step S1908 that the notification scheduled message is the message that has been given to the chat application 701, the process proceeds to the step S1902. This prevents notification of the same content messages to a user.

When it is determined in the step S1908 that the notification scheduled message is not a message that has been given to the chat application 701, the CPU 121 sets the above-mentioned print job as the message notification target (a step S1909), and finishes this process.

In this way, the above-mentioned message notification determination process in FIG. 19 can reduce the unnecessary notifications of the chat.

Moreover, the above-mentioned embodiment may be constituted so that an administrator or a user can set whether the determinations in the steps S1904 through S1908 are executed.

Figure 20:
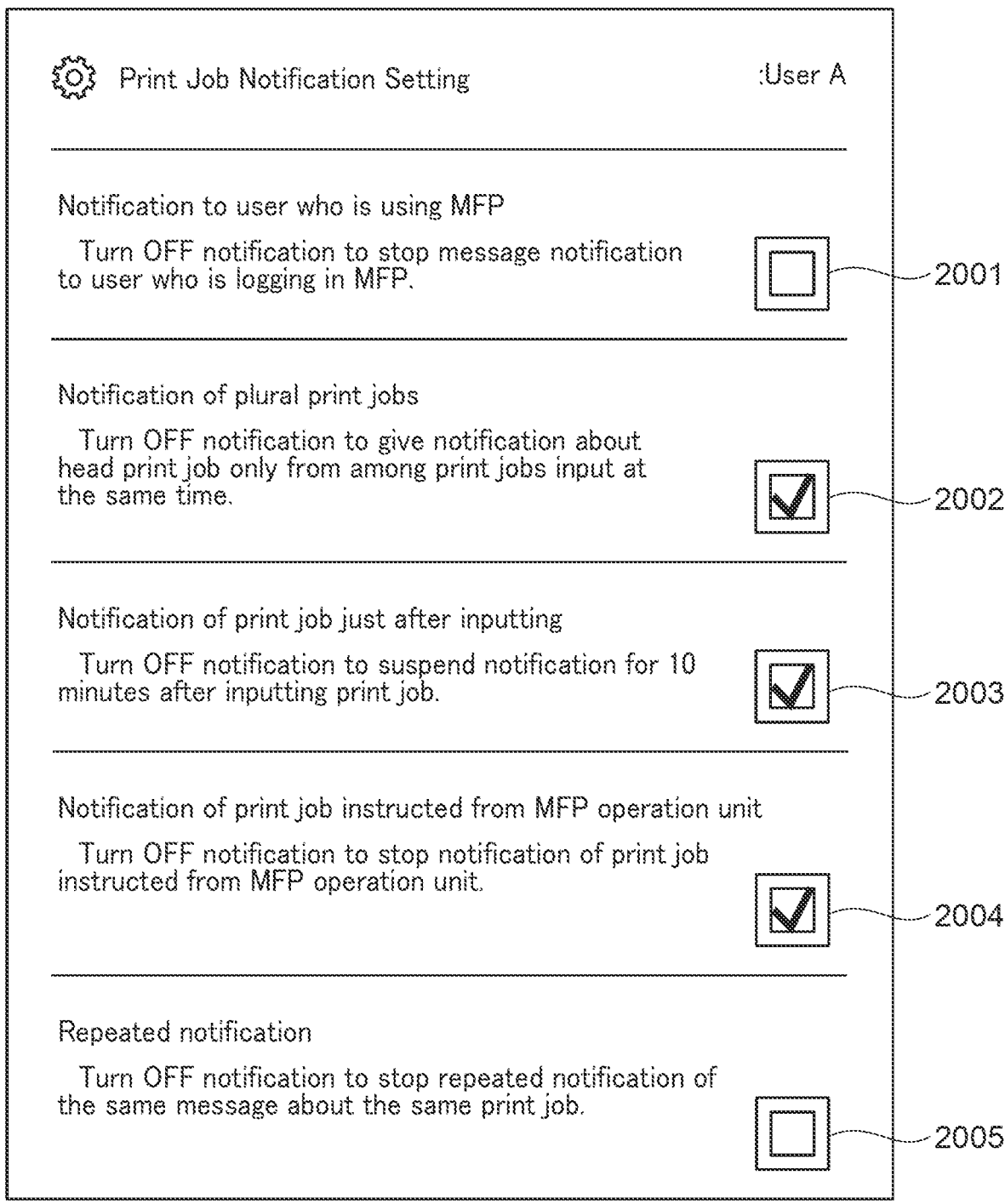
FIG. 20 is a view showing an example of a setting screen used for setting conditions about whether determinations in steps S1904 through S1908 in FIG. 19 are executed.

FIG. 20 is a view showing an example of a setting screen used for setting conditions about whether determinations in the steps S1904 through S1908 in FIG. 19 are executed. The setting screen in FIG. 20 includes check boxes 2001 through 2005.

The check box 2001 is used for switching validity/invalidity of the determination in the step S1904. When the check is not contained, the determination in the step S1904 in the message notification determination process in FIG. 19 becomes valid. In the meantime, when the check is contained, the determination in the step S1904 in the message notification determination process in FIG. 19 becomes invalid, and the process proceeds to the step S1905 without executing the determination in the step S1904.

The check box 2002 is used for switching validity/invalidity of the determination in the step S1905. When the check is not contained, the determination in the step S1905 in the message notification determination process in FIG. 19 becomes valid. In the meantime, when the check is contained, the determination in the step S1905 in the message notification determination process in FIG. 19 becomes invalid, and the process proceeds to the step S1906 regardless of the situation of another print job (without executing the determination in the step S1905).

The check box 2003 is used for switching validity/invalidity of the determination in the step S1906. When the check is not contained, the determination in the step S1906 in the message notification determination process in FIG. 19 becomes valid. In the meantime, when the check is contained, the determination in the step S1906 in the message notification determination process in FIG. 19 becomes invalid, and the process proceeds to the step S1907 regardless of the elapsed time from the input of the print job (without executing the determination in the step S1906).

The check box 2004 is used for switching validity/invalidity of the determination in the step S1907. When the check is not contained, the determination in the step S1907 in the message notification determination process in FIG. 19 becomes valid. In the meantime, when the check is contained, the determination in the step S1907 in the message notification determination process in FIG. 19 becomes invalid, and the process proceeds to the step S1908 regardless of whether the print execution button of the MFP body is pressed (without executing the determination in the step S1907).

The check box 2005 is used for switching validity/invalidity of the determination in the step S1908. When the check is not contained, the determination in the step S1908 in the message notification determination process in FIG. 19 becomes valid. In the meantime, when the check is contained, the determination in the step S1908 in the message notification determination process in FIG. 19 becomes invalid, and the process proceeds to the step S1909 regardless of whether the message has been given (without executing the determination in the step S1908).

When the configuration that enables the user to set whether the determinations in the steps S1904 through S1908 are executed is employed, the user can set the notification conditions of the chat that are suitable for utilizing environment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-017125, filed Feb. 7, 2022, which is hereby incorporated by reference herein in its entirety.

What is claimed is:

1. A server apparatus that notifies an application of a communication terminal of information about a print job executed by an image forming apparatus, the server apparatus comprising:
   an obtainment unit including a processor configured to obtain status information about a print job that is input to the image forming apparatus from an external apparatus; and
   a controller configured to selectively display a message based on the status information on a display unit of the communication terminal,
   wherein the controller is configured to display the message, which shows that a predetermined print job cannot be executed because another print job different from the predetermined print job is under execution, in a case where the predetermined print job is input to the image forming apparatus from the external apparatus and the image forming apparatus is executing the other print job, and
   wherein the controller is configured not to display the message on the display unit of the communication terminal in a case where the user who operates the communication terminal is logging in the image forming apparatus.

2. The server apparatus according to claim 1, wherein the controller is configured to display a message showing that the predetermined print job can be executed in a case where there is not another print job under execution.

3. The server apparatus according to claim 1, wherein the controller is configured to display a message showing that the predetermined print job is under printing during execution of the predetermined print job.

4. The server apparatus according to claim 1, wherein the controller is configured to display a message showing that the predetermined print job is finished in a case where execution of the predetermined print job is finished.

5. The server apparatus according to claim 1, wherein the controller is configured to display a message showing that the predetermined print job is cancelled in a case where the predetermined print job is cancelled.

6. The server apparatus according to claim 1, further comprising a print job cancel control unit including a processor configured to control the image forming apparatus to cancel a print job input to the image forming apparatus from the external apparatus according to an instruction that is input by the user to the communication terminal with respect to a message displayed on the display unit of the communication terminal.

7. The server apparatus according to claim 1, further comprising a print job execution control unit including a processor configured to control the image forming apparatus to execute a hold print job input to the image forming apparatus from the external apparatus according to an instruction that the user inputs into the communication terminal with respect to a message displayed on the display unit of the communication terminal.

8. The server apparatus according to claim 1, wherein the controller is configured to control whether a message is displayed on the display unit of the communication terminal for every print job input to the image forming apparatus from the external apparatus.

9. The server apparatus according to claim 1, wherein the controller is configured to control not to display a message on the display unit of the communication terminal according to an instruction that the user inputs into the communication terminal.

10. The server apparatus according to claim 1, wherein the controller is configured to display a message of a chat on the display unit of the communication terminal.

11. The server apparatus according to claim 10, wherein the controller is configured to control not to display a message on the display unit of the communication terminal in a case where the chat with the communication terminal is finished.

12. The server apparatus according to claim 1, wherein the controller is configured to control not to display a message on the display unit of the communication terminal in a case where another print job input by the user who inputs the predetermined print job prior to the predetermined print job is unfinished.

13. The server apparatus according to claim 1, wherein the controller is configured to control not to display a message on the display unit of the communication terminal until predetermined time elapses from acceptance time of a print job input to the image forming apparatus.

14. The server apparatus according to claim 1,
   wherein the controller is configured to display an operation button to accept an execution instruction for a print job input to the image forming apparatus on the display unit of the communication terminal, and
   wherein the controller is configured to control not to display a message on the display unit of the communication terminal in a case where the print job input to the image forming apparatus is executed according to an instruction issued by a means other than the operation button.

15. The server apparatus according to claim 1, wherein the controller is configured to control not to display same messages on the display unit of the communication terminal.

16. A control method for a server apparatus that notifies an application of a communication terminal of information about a print job executed by an image forming apparatus, the control method comprising:
   an obtainment step of obtaining status information about a print job that is input to the image forming apparatus from an external apparatus; and
   a control step of selectively displaying a message based on the status information on a display unit of the communication terminal,
   wherein the message is a message which shows that a predetermined print job cannot be executed because another print job different from the predetermined print job is under execution, is displayed in the control step in a case where the predetermined print job is input to the image forming apparatus from the external apparatus and the image forming apparatus is executing the other print job, and
   wherein the message is not displayed on the display unit of the communication terminal in a case where the user who operates the communication terminal is logging in the image forming apparatus.

* * * * *